US012783509B1

(12) United States Patent
Amiri et al.

(10) Patent No.: US 12,783,509 B1
(45) Date of Patent: Nov. 3, 2026

(54) SYSTEM AND METHOD FOR ENTITY MATCHING IN DATABASES WITHOUT SEMANTIC INFORMATION

(71) Applicant: JPMorgan Chase Bank, N.A., New York, NY (US)

(72) Inventors: Saeid Amiri, Montclair, NJ (US); Danial Dervovic, London (GB); Michael Cashmore, Falkirk (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 19/212,038

(22) Filed: May 19, 2025

(51) Int. Cl.
*G06F 16/245* (2019.01)
*G06F 16/22* (2019.01)

(52) U.S. Cl.
CPC ........ *G06F 16/245* (2019.01); *G06F 16/2282* (2019.01)

(58) Field of Classification Search
CPC ........................... G06F 16/245; G06F 16/2282
USPC ........ 707/722, 736, 741, 748, 769, 770, 803
See application file for complete search history.

(56) References Cited

U.S. PATENT DOCUMENTS 6,374,256 B1 * 4/2002 Ng ........................ G06F 9/4493 707/999.102
2010/0005054 A1 * 1/2010 Smith ................. G06F 16/2456 707/E17.014
2021/0012246 A1 * 1/2021 Hazard .................. G06N 20/00
2023/0325401 A1 * 10/2023 Martin .................. G06F 16/254 707/602

* cited by examiner

*Primary Examiner* — Phong H Nguyen
(74) *Attorney, Agent, or Firm* — GREENBLUM & BERNSTEIN, P.L.C.

(57) ABSTRACT

Various methods and processes, apparatuses/systems, and media for automatically matching entities in databases without semantic information are disclosed. A processor receives a first and second tabular dataset having corresponding entities without semantic information; applies an artificial intelligence based search algorithm onto the received first and second tabular dataset with a plurality of heuristics that: selects a node represented as a pair of subcolumns within the tabular dataset; evaluates values of the selected node by utilizing a plurality of heuristics; detects, based on evaluating, shared substrings between the first and second tabular dataset that refer to a same record; matches entities between the first and second tabular dataset based on the detected shared substrings; and assigns unique identifiers to the matched entities when it is identified that a number of unique subentities within the pair of subcolumns surpasses a configurable user-defined threshold value.

17 Claims, 8 Drawing Sheets

SYSTEM AND METHOD FOR ENTITY MATCHING IN DATABASES WITHOUT SEMANTIC INFORMATION

TECHNICAL FIELD

This disclosure generally relates to database management, and, more particularly, to methods and apparatuses for implementing a platform, language, cloud, and database agnostic intelligent entity matching module for automatically matching entities in databases without semantic information.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Businesses and other institutions may handle various types of matching tasks every day. These tasks may range from matching products to users in recommender systems, donors to patients in the health sector, financial institution systems, or employees to shifts in operations research, etc. Among the important tasks in database management may include entity matching. For example, in the financial service domain, financial institutions hold multiple accounts, multiple credit cards, mortgages, and/or insurances for various individuals and the like. In such environments, records belonging to the same entity may be treated as belonging to different entities because legacy and disparate management systems lead to poor management system performance and disinformation.

Misidentification of data assets may be a technical problem that may originate from incorrect or incomplete information stored in, for example, large databases. Misidentification of data assets may also originate from the inability of data systems to identify similarities between data that may be textually different but semantically equivalent or related. In general, misidentification of data assets may contribute to the technical problem of entity matching, i.e., the task of identifying data records which refer to or are associated with the same person or non-person entity.

In generic entity matching, the goal may be to identify a tuple of records from two data sources that may refer to the same entity. Entity matching, however, between large datasets may prove to be a challenging task. In the presence of semantics, this problem has been widely studied, and significant progress has been made. However, with no semantics in the data and no available contextual information, this problem may become yet more challenging.

For example, in the absence of semantics, conventional state-of-the-art natural language processing approaches may prove to be incapable of conducting matching, due to their relying on the meaning of text data. The lack of semantic information in data may arise from various factors such as encryption, or internal data transformation syntax, and naming conventions.

Thus, when the data representation are alphanumeric and meaningless values that are generated using unknown hashing functions, conventional tools and methods may not be appropriate for entity matching, thereby increasing overhead in terms of processing resources, time (added latency in data transfers), space, and power in database management.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic intelligent entity matching module configured to automatically match entities in databases without semantic information by utilizing artificial intelligence (AI) based search algorithms that match records between datasets by discovering the correct substrings, or Unique Identifiers (UID), that appear in both datasets, thereby decreasing overhead in terms of processing resources, reducing latency in data transfers, reducing memory space, reducing overall power consumption, etc., in database management, but the disclosure is not limited thereto.

For example, to automatically match entities in databases without semantic information, the platform, language, cloud, and database agnostic intelligent entity matching module may receive a first tabular dataset having corresponding entities without semantic information and a second tabular dataset having corresponding entities without semantic information. The intelligent entity matching module may then apply an artificial intelligence based search algorithm onto the received first and second tabular dataset with a plurality of heuristics. Subsequently, the intelligent entity matching module may select a node represented as a pair of subcolumns within the first and the second tabular dataset. The intelligent entity matching module may also evaluate values of the selected node by utilizing a plurality of heuristics and may detect, based on evaluating, shared substrings between the first and second tabular dataset that refer to a same record. Based on the detected shared substrings, the intelligent entity matching module may automatically match entities between the first and second tabular dataset; and may assign unique identifiers to the matched entities when it is identified that a number of unique subentities within the pair of subcolumns surpasses a configurable user-defined threshold value.

In some embodiments, a method for matching entities in databases without semantic information by utilizing one or more processors along with allocated memory is disclosed. The method may include: receiving a first dataset from a first database, the first dataset having entities without semantic information and representing a first tabular dataset including corresponding columns and rows, wherein each column includes two or more subcolumns, wherein each subcolumn includes one or more subentities, and wherein for a given entity within the first tabular dataset, a subentity represents a substring of the given entity; receiving a second dataset from a second database, the second dataset having entities without semantic information and representing a second tabular dataset including corresponding columns and rows, wherein each column includes two or more subcolumns, wherein each subcolumn includes one or more subentities, and wherein for a given entity within the second tabular dataset, a subentity represents a substring of the given entity; applying an artificial intelligence based search algorithm onto the received first dataset and the second dataset with a plurality of heuristics for: selecting a node represented as a pair of subcolumns, the node having a plurality of attributes; evaluating values of the selected node by utilizing the plurality of heuristics; detecting, based on evaluating, shared substrings between the first tabular dataset and the second tabular dataset that refer to a same record; matching entities between the first tabular dataset and the second tabular dataset based on the detected shared substrings; and assigning unique identifiers to the matched entities when the step of matching identifies that a number of unique subentities within the pair of subcolumns surpasses a configurable user-defined threshold value, thereby reducing processing time for matching entities between the first database and the second database.

In some embodiments according to the method, the artificial intelligence based search algorithm may include a Monte-Carlo tree search algorithm, but the disclosure is not limited thereto.

In some embodiments, prior to applying the artificial intelligence based search algorithm, the method may include a preprocessing algorithm that may include: deleting columns with null values or datetime values from the first tabular dataset and the second tabular dataset; padding rows of the first tabular dataset and the second tabular dataset with a constant character; and generating a uniform length of strings in the columns.

In some embodiments according to the method, in evaluating the selected node, the plurality of heuristics include the following: number of unique values in both subcolumns, wherein the smaller this unique value is, the less likely it is a candidate for matching; sum of the maximum length of string values in both subcolumns; absolute difference between the maximum length of a subcolumn in the first tabular dataset and the second tabular dataset; and number of unique substrings in a subcolumn of the first tabular dataset that also appear in a subcolumn of the second tabular dataset, but the disclosure is not limited thereto.

In some embodiments according to the method, the plurality of attributes of the node “s” may include: name, leaf, value, parent, dummy, child, and tier, wherein s.name is a tuple of subcolumns that it represents; s.parent is a parent node of “s”; s.leaf indicates that the node “s” has not yet been expanded; and s.tier represents how far down a search tree node “s” is, thereby identifying a number of ancestor nodes, but the disclosure is not limited thereto.

In some embodiments according to the method, a node may be terminal when it is not expandable to a sub-tree, and the method may further include: expanding the node “s” to its child nodes in response to determining that the selected node “s” is not a terminal node, wherein the child nodes include all pairs of subcolumns with one size smaller than their parent while bigger than a configurable user-defined threshold size.

In some embodiments according to the method, a dummy node may be a terminal node that does not represent any pairs of subcolumns.

In some embodiments, a system for matching entities in databases without semantic information is disclosed. The system may include: a processor; and a memory operatively connected to the processor via a communication interface, the memory storing computer readable instructions, when executed, may cause the processor to: receive a first dataset from a first database, the first dataset having entities without semantic information and representing a first tabular dataset including corresponding columns and rows, wherein each column includes two or more subcolumns, wherein each subcolumn includes one or more subentities, and wherein for a given entity within the first tabular dataset, a subentity represents a substring of the given entity; receive a second dataset from a second database, the second dataset having entities without semantic information and representing a second tabular dataset including corresponding columns and rows, wherein each column includes two or more subcolumns, wherein each subcolumn includes one or more subentities, and wherein for a given entity within the second tabular dataset, a subentity represents a substring of the given entity; apply an artificial intelligence based search algorithm onto the received first dataset and the second dataset with a plurality of heuristics that: selects a node represented as a pair of subcolumns, the node having a plurality of attributes; evaluates values of the selected node by utilizing the plurality of heuristics; detects, based on evaluating, shared substrings between the first tabular dataset and the second tabular dataset that refer to a same record; matches entities between the first tabular dataset and the second tabular dataset based on the detected shared substrings; and assigns unique identifiers to the matched entities when the step of matching identifies that a number of unique subentities within the pair of subcolumns surpasses a configurable user-defined threshold value, thereby reducing processing time for matching entities between the first database and the second database.

In some embodiments according to the system, in applying the artificial intelligence based search algorithm, the processor may be further configured to apply a Monte-Carlo tree search algorithm, but the disclosure is not limited thereto.

In some embodiments according to the system, prior to applying the artificial intelligence based search algorithm, the processor may be further configured to apply a preprocessing algorithm that may include: deleting columns with null values or datetime values from the first tabular dataset and the second tabular dataset; padding rows of the first tabular dataset and the second tabular dataset with a constant character; and generating a uniform length of strings in the columns.

In some embodiments, in evaluating the selected node “s”, the processor may be further configured to utilize the plurality of heuristics that may include the following: number of unique values in both subcolumns, wherein the smaller this unique value is, the less likely it is a candidate for matching; sum of the maximum length of string values in both subcolumns; absolute difference between the maximum length of a subcolumn in the first tabular dataset and the second tabular dataset; and number of unique substrings in a subcolumn of the first tabular dataset that also appear in a subcolumn of the second tabular dataset, but the disclosure is not limited thereto.

In some embodiments according to the system, the plurality of attributes of the node “s” may include: name, leaf, value, parent, dummy, child, and tier, wherein s.name is a tuple of subcolumns that it represents; s.parent is a parent node of “s”; s.leaf indicates that the node “s” has not yet been expanded; and s.tier represents how far down a search tree node “s” is, thereby identifying a number of ancestor nodes, but the disclosure is not limited thereto.

In some embodiments according to the system, a node may be terminal when it is not expandable to a sub-tree, and the method may further include: expanding the node “s” to its child nodes in response to determining that the selected node “s” is not a terminal node, wherein the child nodes include all pairs of subcolumns with one size smaller than their parent while bigger than a configurable user-defined threshold size.

In some embodiments according to the system, a dummy node may be a terminal node that does not represent any pairs of subcolumns.

In some embodiments, a non-transitory computer readable medium configured to store instructions for matching entities in databases without semantic information is disclosed. The instructions, when executed, may cause a processor to perform the following: receiving a first dataset from a first database, the first dataset having entities without semantic information and representing a first tabular dataset including corresponding columns and rows, wherein each column includes two or more subcolumns, wherein each subcolumn includes one or more subentities, and wherein for a given entity within the first tabular dataset, a subentity represents a substring of the given entity; receiving a second dataset from a second database, the second dataset having entities without semantic information and representing a second tabular dataset including corresponding columns and rows, wherein each column includes two or more subcolumns, wherein each subcolumn includes one or more subentities, and wherein for a given entity within the second tabular dataset, a subentity represents a substring of the given entity; applying an artificial intelligence based search algorithm onto the received first dataset and the second dataset with a plurality of heuristics for: selecting a node represented as a pair of subcolumns, the node having a plurality of attributes; evaluating values of the selected node by utilizing the plurality of heuristics; detecting, based on evaluating, shared substrings between the first tabular dataset and the second tabular dataset that refer to a same record; matching entities between the first tabular dataset and the second tabular dataset based on the detected shared substrings; and assigning unique identifiers to the matched entities when the step of matching identifies that a number of unique subentities within the pair of subcolumns surpasses a configurable user-defined threshold value, thereby reducing processing time for matching entities between the first database and the second database.

In some embodiments according to the non-transitory computer readable medium, the artificial intelligence based search algorithm may include a Monte-Carlo tree search algorithm, but the disclosure is not limited thereto.

In some embodiments, prior to applying the artificial intelligence based search algorithm, the instructions, when executed, may cause the processor to further perform the following: deleting columns with null values or datetime values from the first tabular dataset and the second tabular dataset; padding rows of the first tabular dataset and the second tabular dataset with a constant character; and generating a uniform length of strings in the columns.

In some embodiments according to the non-transitory computer readable medium, in evaluating the selected node "s", the plurality of heuristics may include the following: number of unique values in both subcolumns, wherein the smaller this unique value is, the less likely it is a candidate for matching; sum of the maximum length of string values in both subcolumns; absolute difference between the maximum length of a subcolumn in the first tabular dataset and the second tabular dataset; and number of unique substrings in a subcolumn of the first tabular dataset that also appear in a subcolumn of the second tabular dataset, but the disclosure is not limited thereto.

In some embodiments according to the non-transitory computer readable medium, the plurality of attributes of the node "s" may include: name, leaf, value, parent, dummy, child, and tier, wherein s.name is a tuple of subcolumns that it represents; s.parent is a parent node of "s"; s.leaf indicates that the node "s" has not yet been expanded; and s.tier represents how far down a search tree node "s" is, thereby identifying a number of ancestor nodes, but the disclosure is not limited thereto.

In some embodiments according to the non-transitory computer readable medium, a node may be terminal when it is not expandable to a sub-tree, and the instructions, when executed, cause the processor to further perform the following: expanding the node "s" to its child nodes in response to determining that the selected node "s" is not a terminal node, wherein the child nodes include all pairs of subcolumns with one size smaller than their parent while bigger than a configurable user-defined threshold size.

In some embodiments according to the non-transitory computer readable medium, a dummy node may be a terminal node that does not represent any pairs of subcolumns.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
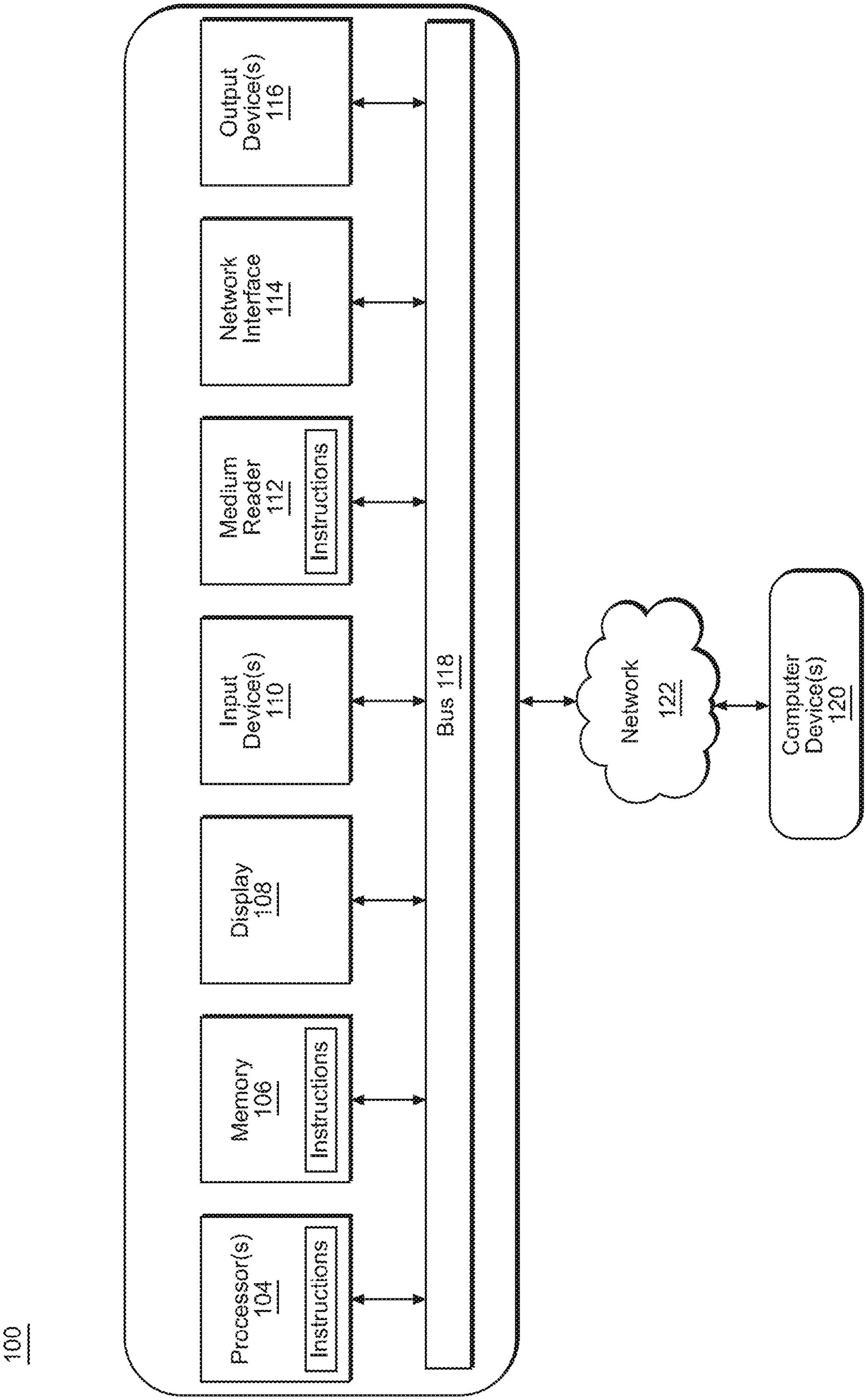
FIG. 1 illustrates a computer system for implementing a platform, language, database, and cloud agnostic intelligent entity matching module for entity matching of tabular data with no semantic information in accordance with an embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in may include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art may appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

As mentioned earlier, in generic entity matching, the goal may be to identify a tuple of records from two data sources that may refer to the same entity. Entity matching, however, between large datasets may prove to be a challenging task. In the presence of semantics, this problem has been widely studied, and significant progress has been made. However, with no semantics in the data and no available contextual information, this problem may become yet more challenging.

For example, in the absence of semantics, conventional state-of-the-art natural language processing methods may prove to be incapable of conducting matching, due to their relying on the meaning of text data. The lack of semantic information in data may arise from various factors such as encryption, or internal data transformation syntax, and naming conventions.

These conventional methods may utilize rule generation to perform interpretable entity matching that satisfy matching criteria. These rules may encode user knowledge and compare similarity measures in the data such as edit or cosine distance. Classical machine learning methods also showed potential in providing solutions for this problem. After the rise of deep learning, researchers leveraged this family of models in entity matching problems. Specifically, recurrent neural networks (RNNs) and sequence models are widely used for entity matching, which is later followed by embedding-based techniques.

Apart from entity matching, a relevant but different task in database management may include schema matching. For instance, data engineers often need to explore datalakes to find tables that can be joinable or unionable. In order for such operations to be successful and meaningful, the involved tables schema may need to be matched as a prerequisite. There are several works on automated schema matching that study the attribute, semantics, data type, value overlap, and the similarity of embeddings and numerical distributions.

These conventional methods mentioned above may only be applicable to matching entities with semantics. However, when the data representation are alphanumeric and meaningless values that are generated using unknown hashing functions, deep learning methods and attention mechanisms may not be appropriate tools for entity matching, thereby increasing overhead in terms of processing resources, time (added latency in data transfers), space, and power in database management.

The disclosed embodiments implement a platform, language, cloud, and database agnostic intelligent entity matching module configured to automatically match entities in databases without semantic information by utilizing AI-based search algorithms with multiple heuristics that match records between datasets by discovering the correct substrings, or UID, that appear in both datasets, thereby decreasing overhead in terms of processing resources, reducing latency in data transfers, reducing memory space, reducing overall power consumption, etc., in database management, but the disclosure is not limited thereto.

While many of the exemplary embodiments discussed herein focus on applications in database management domain, it should be understood that the technology described herein may be applied to a wide variety of other application domains.

FIG. 1 is an exemplary system 100 for use in implementing the platform, language, database, and cloud agnostic intelligent entity matching module configured to automatically match entities of tabular data with not semantic information between two databases in accordance with an embodiment. The system 100 is generally shown and may include a computer system 102, which is generally indicated.

The computer system 102 may include a set of instructions that may be executed to cause the computer system 102 to perform any one or more of the methods or computer-based functions disclosed herein, either alone or in combination with the other described devices. The computer system 102 may operate as a standalone device or may be connected to other systems or peripheral devices. In some embodiments, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 may be tangible and non-transitory. As used herein, the term "non-transitory" is to be interpreted not as an eternal characteristic of a state, but as a characteristic of a state that may last for a period of time. The term "non-transitory" specifically disavows fleeting characteristics such as characteristics of a particular carrier wave or signal or other forms that exist only transitorily in any place at any time. The processor 104 may be an article of manufacture and/or a machine component. The processor 104 may be configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that may store data and executable instructions, and are non-transitory during the time instructions are stored therein. Again, as used herein, the term "non-transitory" is to be interpreted not as an eternal characteristic of a state, but as a characteristic of a state that may last for a period of time. The term "non-transitory" specifically disavows f. fleeting characteristics such as characteristics of a particular carrier wave or signal or other forms that exist only transitorily in any place at any time. The memories are an article of manufacture and/or machine component. Memories described herein are computer-readable mediums from which data and executable instructions may be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which may be configured to read any one or more sets of instructions, e.g., software, from any of the memories described herein. The instructions, when executed by a processor, may be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, in some embodiments, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that may be capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. In some embodiments, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In some embodiments, the intelligent entity matching module may be platform, language, database, and cloud agnostic that may allow for consistent easy orchestration and passing of data through various components of the intelligent entity matching module to output a desired result, i.e., assigned unique identifiers (UIDs), regardless of platform, browser, language, database, and cloud environment. Since the disclosed process, in some embodiments, may be platform, language, database, browser, and cloud agnostic, the intelligent entity matching module may be independently tuned or modified for optimal performance without affecting the configuration or data files. The configuration or data files, in some embodiments, may be written using JSON, but the disclosure is not limited thereto. In some embodiments, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations may include distributed processing, component/object distributed processing, and an operation mode having parallel processing capabilities. Virtual computer system processing may be constructed to implement one or more of the methods or functionality as described herein, and a processor described herein may be used to support a virtual processing environment.

Figure 2:
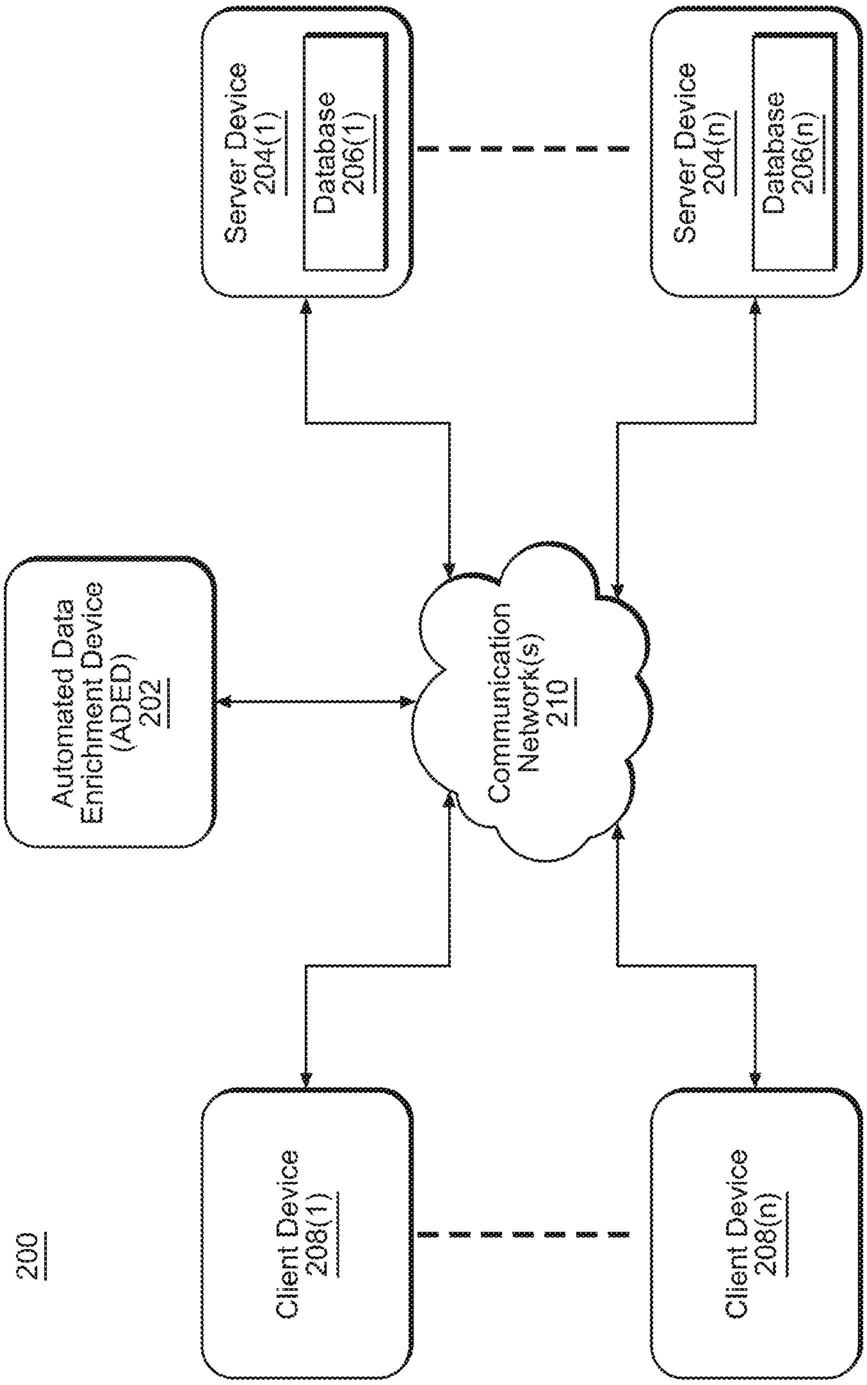
FIG. 2 illustrates a diagram of a network environment with a platform, language, database, and cloud agnostic intelligent entity matching device in accordance with an embodiment.

Referring to FIG. 2, a schematic of an exemplary network environment 200 for implementing a language, platform, database, and cloud agnostic intelligent entity matching device (IEMD) of the instant disclosure is illustrated.

In some embodiments, the above-described problems associated with conventional tools may be overcome by implementing an IEMD 202 as illustrated in FIG. 2 that may be configured for implementing a platform, language, database, and cloud agnostic intelligent entity matching module configured to automatically match entities in databases without semantic information by utilizing AI-based search algorithms with multiple heuristics that match records between datasets by discovering the correct substrings, or UID, that appear in both datasets, thereby decreasing overhead in terms of processing resources, reducing latency in data transfers, reducing memory space, reducing overall power consumption, etc., in database management, but the disclosure is not limited thereto.

In some embodiments, the intelligent entity matching module within the IEMD 202 disclosed herein may be configured to: provide real time monitoring and diagnosing issues, e.g., facilitating real-time tracking of database entities and hardware health in a distributed environment without affecting application performance; timely identifying any latency issues at both the node and database levels, and helping in quick resolution to improve overall system performance, but the disclosure is not limited thereto.

The IEMD 202 may have one or more computer system 102*s*, as described with respect to FIG. 1, which in aggregate provide the necessary functions.

The IEMD 202 may store one or more applications that may include executable instructions that, when executed by the IEMD 202, cause the IEMD 202 to perform actions, such as to transmit, receive, or otherwise process network messages, in some embodiments, and to perform other actions described and illustrated below with reference to the figures. The application(s) may be implemented as modules or components of other applications. Further, the application(s) may be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the IEMD 202 itself, may be located in virtual server(s) running in a cloud-based computing environment rather than being tied to one or more specific physical network computing devices. Also, the application(s) may be running in one or more virtual machines (VMs) executing on the IEMD 202. Additionally, in one or more embodiments of this technology, virtual machine(s) running on the IEMD 202 may be managed or supervised by a hypervisor.

In the network environment 200 of FIG. 2, the IEMD 202 may be coupled to a plurality of server devices 204(1)-204 (*n*) that hosts a plurality of databases 206 (1)-206 (*n*), and also to a plurality of client devices 208(1)-208(*n*) via communication network(s) 210. A communication interface of the IEMD 202, such as the network interface 114 of the computer system 102 of FIG. 1, operatively couples and communicates between the IEMD 202, the server devices 204(1)-204 (*n*), and/or the client devices 208(1)-208(*n*), which may all be coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the IEMD 202, the server devices 204 (1)-204 (*n*), and/or the client devices 208(1)-208(*n*) may be coupled together via other topologies.

Additionally, the network environment 200 may include other network devices such as one or more routers and/or switches, in some embodiments, which are well known in the art and thus may not be described herein.

By way of example only, the communication network(s) 210 may include local area network(s) (LAN(s)) or wide area network(s) (WAN(s)), and may use TCP/IP over Ethernet and industry-standard protocols, although other types and/or numbers of protocols and/or communication networks may be used. The communication network(s) 210 in this example may employ any suitable interface mechanisms and network communication technologies including, in some embodiments, teletraffic in any suitable form (e.g., voice, modem, and the like), Public Switched Telephone Network (PSTNs), Ethernet-based Packet Data Networks (PDNs), combinations thereof, and the like.

The IEMD 202 may be a standalone device or integrated with one or more other devices or apparatuses, such as one or more of the server devices 204(1)-204 (*n*). In some embodiments, the IEMD 202 may be hosted by one of the server devices 204(1)-204 (*n*), and other arrangements may also be possible. Moreover, one or more of the devices of the IEMD 202 may be in the same or a different communication network including one or more public, private, or cloud networks, in some embodiments.

The plurality of server devices 204(1)-204 (*n*) may be the same or similar to the computer system 102 or the computer device 120 as described with respect to FIG. 1, including any features or combination of features described with respect thereto. In some embodiments, any of the server devices 204(1)-204 (*n*) may include, among other features, one or more processors, a memory, and a communication interface, which may be coupled together by a bus or other communication link, although other numbers and/or types of network devices may be used. The server devices 204(1)-204 (*n*) in this example may process requests received from the IEMD 202 via the communication network(s) 210 according to the HTTP-based and/or JSON protocol, in some embodiments, although other protocols may also be used.

The server devices 204(1)-204 (*n*) may be hardware or software or may represent a system with multiple servers in a pool, which may include internal or external networks. The server devices 204(1)-204 (*n*) hosts the databases 206 (1)-206 (*n*) that may be configured to store metadata sets, data quality rules, and newly generated data.

Although the server devices 204(1)-204 (*n*) are illustrated as single devices, one or more actions of each of the server devices 204(1)-204 (*n*) may be distributed across one or more distinct network computing devices that together comprise one or more of the server devices 204(1)-204 (*n*). Moreover, the server devices 204(1)-204 (*n*) are not limited to a particular configuration. Thus, the server devices 204 (1)-204 (*n*) may contain a plurality of network computing devices that operate using a master/slave approach, whereby one of the network computing devices of the server devices 204(1)-204 (*n*) operates to manage and/or otherwise coordinate operations of the other network computing devices.

In some embodiments, the server devices 204(1)-204 (*n*) may operate as a plurality of network computing devices within a cluster architecture, a peer-to peer architecture, virtual machines, or within a cloud architecture. Thus, the technology disclosed herein is not to be construed as being limited to a single environment and other configurations and architectures may also be envisaged.

The plurality of client devices 208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204 (*n*) or other client devices 208(1)-208(*n*).

In some embodiments, the client devices 208(1)-208(*n*) in this example may include any type of computing device that may facilitate the implementation of the IEMD 202 that may efficiently provide a platform for implementing a platform, language, database, and cloud agnostic intelligent entity matching module configured to automatically match entities in databases without semantic information by utilizing AI-based search algorithms with multiple heuristics that match records between datasets by discovering the correct substrings, or UID, that appear in both datasets, thereby decreasing overhead in terms of processing resources, reducing latency in data transfers, reducing memory space, reducing overall power consumption, etc., in database management, but the disclosure is not limited thereto.

The client devices 208(1)-208(*n*) may run interface applications, such as standard web browsers or standalone client applications, which may provide an interface to communicate with the IEMD 202 via the communication network(s) 210 in order to communicate user requests. The client devices 208(1)-208(*n*) may further include, among other features, a display device, such as a display screen or touchscreen, and/or an input device, such as a keyboard, in some embodiments.

Although the exemplary network environment 200 with the IEMD 202, the server devices 204(1)-204 (*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the IEMD 202, the server devices 204(1)-204 (*n*), or the client devices 208(1)-208(*n*), in some embodiments, may be configured to operate as virtual instances on the same physical machine. In some embodiments, one or more of the IEMD 202, the server devices 204 (1)-204 (*n*), or the client devices 208(1)-208(*n*) may operate on the same physical device rather than as separate devices communicating through communication network(s) 210.

Additionally, there may be more or fewer IEMDs 202, server devices 204(1)-204 (*n*), or client devices 208(1)-208(*n*) than illustrated in FIG. 2. In some embodiments, the IEMD 202 may be configured to send code at run-time to remote server devices 204(1)-204 (*n*), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
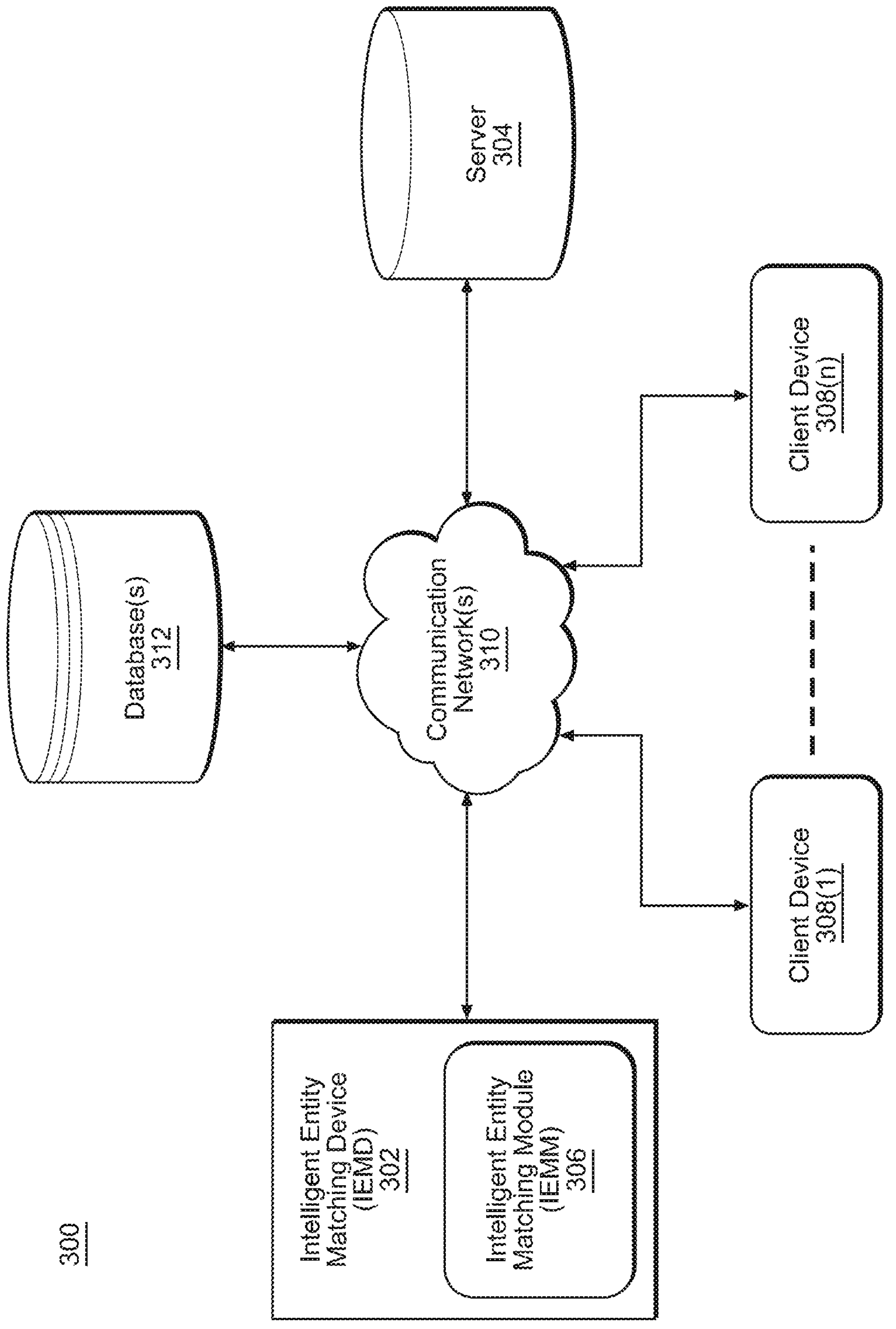
FIG. 3 illustrates a system diagram for implementing a platform, language, database, and cloud agnostic intelligent entity matching device having a platform, language, database, and cloud agnostic intelligent entity matching module in accordance with an embodiment.

FIG. 3 illustrates a system diagram for implementing a platform, language, and cloud agnostic IEMD having a platform, language, database, and cloud agnostic intelligent entity matching module (IEMM) in accordance with an embodiment.

As illustrated in FIG. 3, the system 300 may include an IEMD 302 within which an IEMM 306 may be embedded, a server 304, a database(s) 312, a plurality of client devices 308(1) . . . 308(*n*), and a communication network 310.

In some embodiments, the IEMD 302 including the IEMM 306 may be connected to the server 304, and the database(s) 312 via the communication network 310.

The IEMD 302 may also be connected to the plurality of client devices 308(1) . . . 308(*n*) via the communication network 310, but the disclosure is not limited thereto.

According to an exemplary embodiment, the IEMD 302 is described and shown in FIG. 3 as including the IEMM 306, although it may include other rules, policies, modules, databases, or applications, etc. In some embodiments, the database(s) 312 may be configured to store ready to use modules written for each Application Programming Interface (API) for all environments. Although only one database is illustrated in FIG. 3, the disclosure is not limited thereto. Any number of desired databases may be utilized for use in the disclosed invention herein. The database(s) 312 may be a mainframe database, a log database that may produce programming for searching, monitoring, and analyzing machine-generated data via a web interface, etc., but the disclosure is not limited thereto.

In some embodiments, the IEMM 306 may be configured to receive real-time feed of data from the plurality of client devices 308(1) . . . 308(*n*) and secondary sources via the communication network 310.

As may be described below, the IEMM 306 may be configured to: receive a first dataset from a first database, the first dataset having entities without semantic information and representing a first tabular dataset including corresponding columns and rows, wherein each column includes two or more subcolumns, wherein each subcolumn includes one or more subentities, and wherein for a given entity within the first tabular dataset, a subentity represents a substring of the given entity; receive a second dataset from a second database, the second dataset having entities without semantic information and representing a second tabular dataset including corresponding columns and rows, wherein each column includes two or more subcolumns, wherein each subcolumn includes one or more subentities, and wherein for a given entity within the second tabular dataset, a subentity represents a substring of the given entity; apply an artificial intelligence based search algorithm onto the received first dataset and the second dataset with a plurality of heuristics that: selects a node represented as a pair of subcolumns, the node having a plurality of attributes; evaluates values of the selected node by utilizing the plurality of heuristics; detects, based on evaluating, shared substrings between the first tabular dataset and the second tabular dataset that refer to a same record; matches entities between the first tabular dataset and the second tabular dataset based on the detected shared substrings; and assigns unique identifiers to the matched entities when the step of matching identifies that a number of unique subentities within the pair of subcolumns surpasses a configurable user-defined threshold value, thereby reducing processing time for matching entities between the first database and the second database, but the disclosure is not limited thereto.

The plurality of client devices 308(1) . . . 308(*n*) are illustrated as being in communication with the IEMD 302. In this regard, the plurality of client devices 308(1) . . . 308(*n*) may be "clients" (e.g., customers) of the IEMD 302 and are described herein as such. Nevertheless, it is to be known and understood that the plurality of client devices 308(1) . . . 308(*n*) need not necessarily be "clients" of the IEMD 302, or any entity described in association therewith herein. Any additional or alternative relationship may exist between either or both of the plurality of client devices 308(1) . . . 308(*n*) and the IEMD 302, or no relationship may exist.

The first client device 308 (1) may be, in some embodiments, a smart phone. Of course, the first client device 308 (1) may be any additional device described herein. The second client device 308(*n*) may be, in some embodiments, a personal computer (PC). Of course, the second client device 308(*n*) may also be any additional device described herein. In some embodiments, the server 304 may be the same or equivalent to the server device 204 as illustrated in FIG. 2.

The process may be executed via the communication network 310, which may comprise plural networks as described above. In an embodiment, one or more of the plurality of client devices 308(1) . . . 308(*n*) may communicate with the IEMD 302 via broadband or cellular communication. Of course, these embodiments are merely exemplary and are not limiting or exhaustive.

The computing device 301 may be the same or similar to any one of the client devices 208(1)-208(*n*) as described with respect to FIG. 2, including any features or combination of features described with respect thereto. The IEMD 302 may be the same or similar to the IEMD 202 as described with respect to FIG. 2, including any features or combination of features described with respect thereto.

Figure 4:
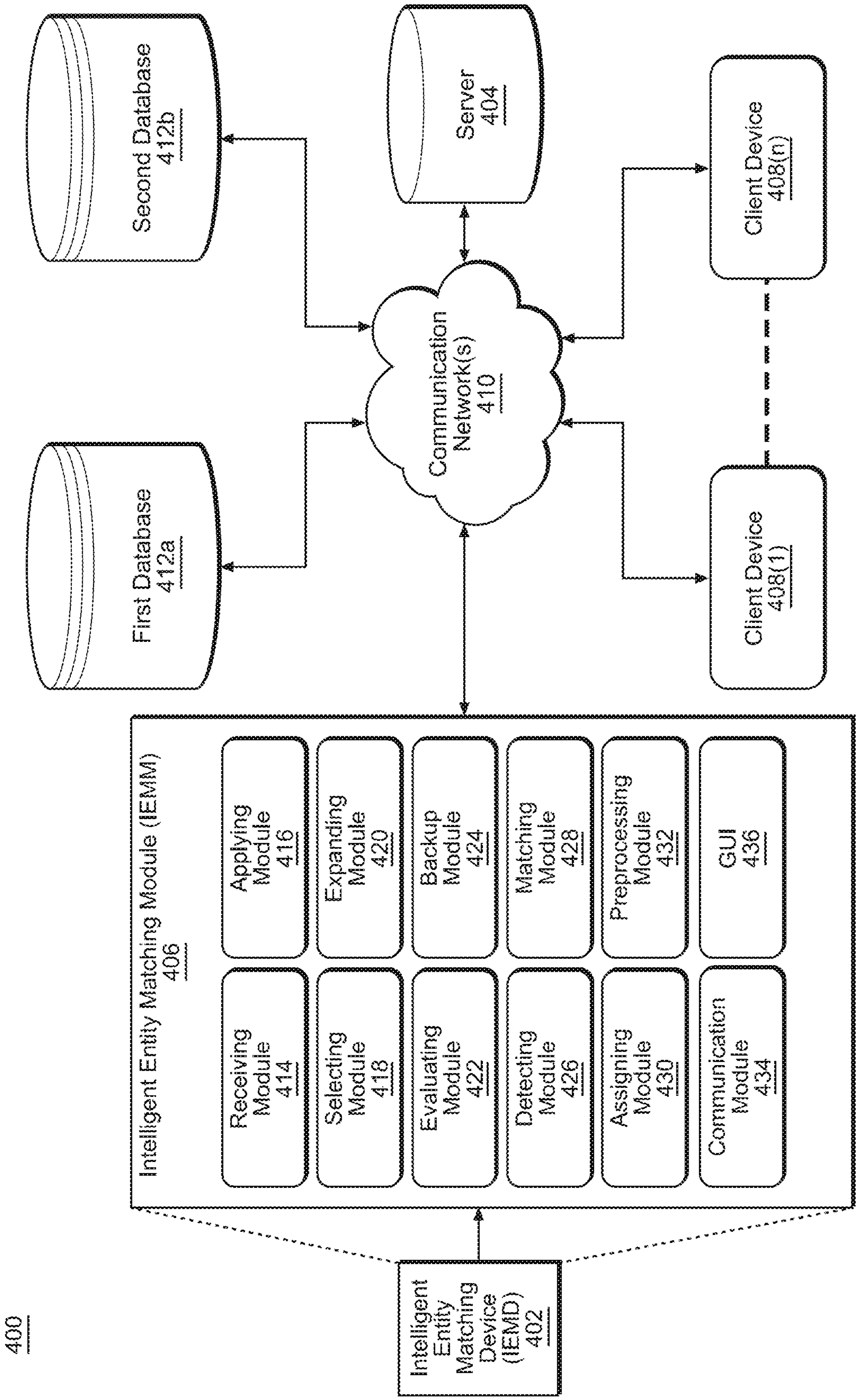
FIG. 4 illustrates a system diagram for implementing a platform, language, database, and cloud agnostic intelligent entity matching module of FIG. 3 in accordance with an embodiment.

FIG. 4 illustrates a system diagram for implementing a platform, language, database, and cloud agnostic IEMM of FIG. 3 in accordance with an exemplary embodiment.

In some embodiments, the system 400 may include a platform, language, database, and cloud agnostic IEMD 402 within which a platform, language, database, and cloud agnostic IEMM 406 may be embedded, a server 404, a communication network 410, a first database 412*a*, and a second database 412*b*. In some embodiments, the server 404 may comprise a plurality of servers located centrally or located in different locations, but the disclosure is not limited thereto.

In some embodiments, the IEMD 402 including the IEMM 406 may be connected to the server 404, the first database 412*a*, and the second database 412*b*, via the communication network 410. The IEMD 402 may also be connected to the plurality of client devices 408(1)-408(*n*) via the communication network 410, but the disclosure is not limited thereto. The IEMM 406, the server 404, the plurality of client devices 408(1)-408(*n*), the databases 412*a*, 412*b*, and the communication network 410 as illustrated in FIG. 4 may be the same or similar configuration to the IEMM 306, the server 304, the plurality of client devices 308(1)-308(*n*), the database(s) 312, the communication network 310, respectively, as illustrated in FIG. 3.

In some embodiments, as illustrated in FIG. 4, the IEMM 406 may include a receiving module 414, an applying module 416, a selecting module 418, an expanding module 420, an evaluating module 422, a backup module 424, a detecting module 426, a matching module 428, an assigning module 430, a preprocessing module 432, a communication module 434, and a Graphical User Interface (GUI) 436. In some embodiments, interactions and data exchange among these modules included in the IEMM 406 provide the advantageous effects of the disclosed invention. Functionalities of each module of FIG. 4 may be described in detail below with reference to FIGS. 4-8.

In some embodiments, each of the receiving module 414, applying module 416, selecting module 418, expanding module 420, evaluating module 422, backup module 424, detecting module 426, matching module 428, assigning module 430, preprocessing module 432, and the communication module 434 of the IEMM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

In some embodiments, each of the receiving module 414, applying module 416, selecting module 418, expanding module 420, evaluating module 422, backup module 424, detecting module 426, matching module 428, assigning module 430, preprocessing module 432, and the communication module 434 of the IEMM 406 of FIG. 4 may be implemented by microprocessors or similar, and may be programmed using software (e.g., microcode) to perform various functions discussed herein and may optionally be driven by firmware and/or software.

Alternatively, in some embodiments, each of the receiving module 414, applying module 416, selecting module 418, expanding module 420, evaluating module 422, backup module 424, detecting module 426, matching module 428, assigning module 430, preprocessing module 432, and the communication module 434 of FIG. 4 may be implemented by dedicated hardware, or as a combination of dedicated hardware to perform some functions and a processor (e.g., one or more programmed microprocessors and associated circuitry) to perform other functions, but the disclosure is not limited thereto. In some embodiments, the IEMM 406 of FIG. 4 may also be implemented by cloud-based deployment.

In some embodiments, each of the receiving module 414, applying module 416, selecting module 418, expanding module 420, evaluating module 422, backup module 424, detecting module 426, matching module 428, assigning module 430, preprocessing module 432, and the communication module 434 of the IEMM 406 of FIG. 4 may be called via corresponding API, but the disclosure is not limited thereto. For example, in some embodiments, the receiving module 414 may be called via a first API, the applying module 416 may be called via a second API, the selecting module 418 may be called via a third API, the expanding module 420 may be called via a fourth API, the evaluating module 422 may be called via a fifth API, the backup module 424 may be called via a sixth API, the detecting module 426 may be called via a seventh API, the matching module 428 may be called via an eighth API, the assigning module 430 may be called via a ninth API, the preprocessing module 432 may be called via a tenth API, and the communication module 434 may be called via an eleventh API. In some embodiments, calls may also be made using event-based message interfaces in addition to APIs. An event-based message interface may be a design pattern that enables communication between services by defining events and handlers that process them. This approach may allow for efficient communication and decoupled components, which may lead to more flexible and modular systems.

In some embodiments, the process implemented by the IEMM 406 may be executed via the communication module 434, and the communication network 410, which may comprise plural networks as described above. In some embodiments, in an exemplary embodiment, the various components of the IEMM 406 may communicate with the server 404, the first database 412*a*, the second database 412*b*, and other systems of records via the communication module 434 and the communication network 410 and the results may be displayed onto the GUI 436. Of course, these embodiments are merely exemplary and are not limiting or exhaustive. The databases 412*a*, 412*b* may include the databases included within the private cloud and/or public cloud and the server 404 may include one or more servers within the private cloud and the public cloud.

Figure 5:
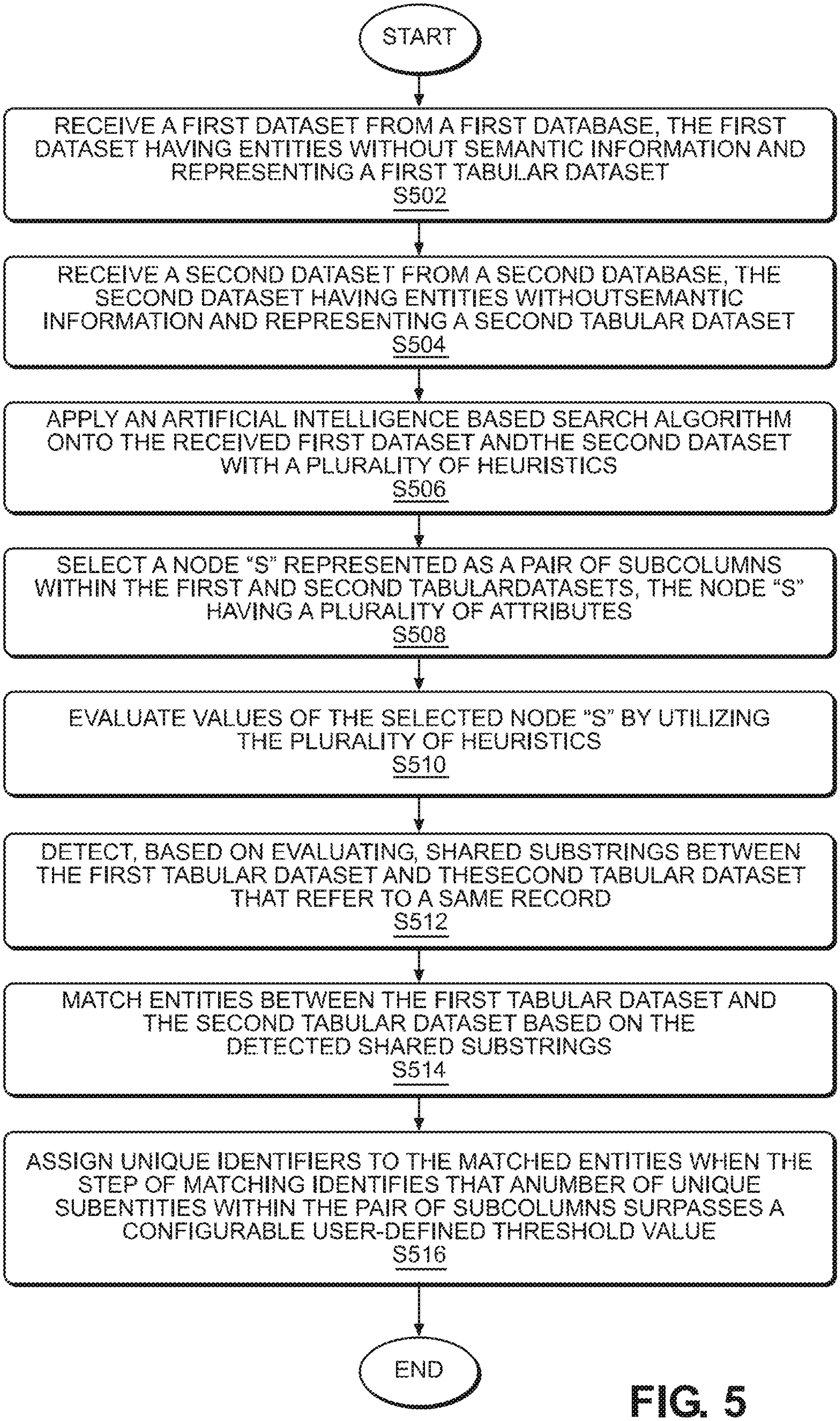
FIG. 5 illustrates a flow chart of a process implemented by the platform, language, database, and cloud agnostic intelligent entity matching module of FIG. 4 for entity matching of tabular data with no semantic information in accordance with an embodiment.

FIG. 5 illustrates a flow chart of a process 500 implemented by the IEMM 406 of FIG. 4 for automatic entity matching of tabular data with no semantic information in accordance with an embodiment. It may be appreciated that the illustrated process 500 and associated steps may be performed in a different order, with illustrated steps omitted, with additional steps added, or with a combination of reordered, combined, omitted, or additional steps.

In some embodiments, the interactions among the components of the IEMM 406 of FIG. 4 utilizing the steps of FIG. 5, cause the IEMM 406 to create automatically match entities in databases 412*a*, 412*b* without semantic information by utilizing AI based search algorithms that match records between datasets by discovering the correct substrings, or UID, that appear in both datasets, thereby decreasing overhead in terms of processing resources, reducing latency in data transfers, reducing memory space, reducing overall power consumption, etc., in database management, but the disclosure is not limited thereto.

The interactions among the components of the IEMM 406 of FIG. 4 utilizing the steps of FIG. 5 are disclosed below.

For example, to automatically match entities in databases 412*a*, 412*b* without semantic information, the IEMM 406 may receive a first tabular dataset having corresponding entities without semantic information and a second tabular dataset having corresponding entities without semantic information. The IEMM 406 may then apply an AI based search algorithm onto the received first and second tabular dataset with a plurality of heuristics. Subsequently, the IEMM 406 may select a node represented as a pair of subcolumns within the first and the second tabular dataset. The IEMM 406 may also evaluate values of the selected node by utilizing a plurality of heuristics and may detect, based on evaluating, shared substrings between the first and second tabular dataset that refer to a same record. Based on the detected shared substrings, the IEMM 406 may automatically match entities between the first and second tabular dataset; and may assign unique identifiers to the matched entities when it is identified that a number of unique subentities within the pair of subcolumns surpasses a configurable user-defined threshold value.

Referring to FIGS. 4-5, in some embodiments, at step S502, the process 500 may include receiving, by calling the receiving module 414 via the first API, a first dataset from the first database 412*a*. The first dataset may include entities without semantic information and may represent a first tabular dataset including corresponding columns and rows, wherein each column includes two or more subcolumns, wherein each subcolumn includes one or more subentities, and wherein for a given entity within the first tabular dataset, a subentity represents a substring of the given entity.

In some embodiments, an "entity" within the context of the present disclosure may correspond to a distinct object or concept represented by a row in a table. Each row typically corresponds to one entity. For example, in a table of employees, each employee is an entity, but the disclosure is not limited thereto.

A "subentity" within the context of the present disclosure may correspond to a logical component or division of an entity, often used to describe hierarchical or related parts of an entity. For example, if the entity is "employee," subentities may be "full-time employee" or "contractor," but the disclosure is not limited thereto. Alternatively, in hierarchical data, subentity may be a department within a company, but the disclosure is not limited thereto.

A "substring" within the context of the present disclosure may be a sequence of characters that is part of a string within a cell (value in a table). For example, "John" is a substring of the full name "John Smith", but the disclosure is not limited thereto.

A "column" within the context of the present disclosure may be a vertical group of cells in a table that represents a single attribute of all entities in the dataset. For example, a "Name" or "Email" column, but the disclosure is not limited thereto. Each column may include a heading.

A "subcolumn" within the context of the present disclosure may be a more granular division within a column, often used informally or structurally (e.g., multi-level headers or compound fields). For example, in an "Address" column: "Street", "City", and "Zip" may be represented as subcolumns, but the disclosure is not limited thereto.

A "row" within the context of the present disclosure may be a horizontal line of data in a table, representing one instance of an entity and its attributes. Each row may contain data values for each column. For example, one row may represent a single employee with their Name, Age, and Department. For example, a row might contain data for one customer: Name= "John Smith", Age=30, but the disclosure is not limited thereto.

In some embodiments, in the context of entity matching, semantic information may refer to the meaning or contextual understanding of data used to determine whether two records refer to the same real-world entity, even if their values differ syntactically. For example, for two records: Record A: "company name": "ABC Inc.", "location": "VA"; Record B: "company name": "abcp Inc.", "location": "Fairfax, Virginia"; using semantic information (e.g., knowing abcp is ABC's parent company), an entity matching system may correctly identity these as referring to the same entity. "Entities without semantic information" may simply refer to that the knowledge regarding "abcp Inc." being the parent of "ABC Inc." is missing from the tabular data set as mentioned earlier.

For example, referring back to FIGS. 4-5, in some embodiments, the first dataset may include entities without semantic information and representing a first tabular dataset D including columns $d_i$, with a total of ND columns (0<i≤ND), where given an entity e, subentity e [p, k] is a substring of e that starts at index p and ends at index k inclusive, and where $d_i$ [p, k] denotes a subcolumn that captures all e [p, k] substrings within the $d_i$ column. The rth row in that column $d_i$ may be represented as $d_i$ [p, k] [r].

For example, if the first tabular dataset D includes data corresponding to a mortgage loan application of a user, within columns $d_i$, the first column may include a "name," the second column may include a "date of birth" column, the third column may include an "income" column, the ith column may include "job information" column, etc. In this example, the total of ND columns of the first tabular dataset D may include four columns, but the disclosure is not limited thereto.

Entities e may represent data included within these columns $d_i$. For example, in the "name" column, entity may represent the name of the user, e.g., John Doe. In the "date of birth" column, entity may represent the date of birth of John Doe. In the "income" column, entity may represent yearly income of John Doe, etc., but the disclosure is not limited thereto.

A subentity may represent whether John Doe is a male or female under the "name" column, where "male" designation may be represented in a first subcolumn and "female" designation may be represented in a second subcolumn within the "name" column, but the disclosure is not limited thereto. Similarly, a subentity may represent that the date of birth of John Doe is Nomveber 1, 1979 in the "date of birth" column, where the month of birth "November" may be represented in a first subcolumn under the "date of birth" column, day of birth "1" may be represented in a second subcolumn under the "date of birth" column, and the year of birth "1979" may be represented in a third subcolumn under the "date of birth" column, etc., but the disclosure is not limited thereto.

Thus, in the above example, a "substring" including the "name" column and the "date of birth" column may be represented as "John_Doe_Male_Nov. 1 1979".

At step S504, the process 500 implemented by the IEMM 406 of FIG. 4 may further include receiving, by calling the receiving module 414 via the first API, a second dataset from the second database 412*b*. The second dataset may include entities without semantic information and representing a second tabular dataset including corresponding columns and rows, wherein each column includes two or more subcolumns, wherein each subcolumn includes one or more subentities, and wherein for a given entity within the second tabular dataset, a subentity represents a substring of the given entity.

For example, the second dataset having entities without semantic information and representing a second tabular dataset D' may include columns d'i, with a total of ND' columns (0<i≤ND'), where given an entity e', subentity e' [p', k'] is a substring of e' that starts at index p' and ends at index k' inclusive, and where d'i [p', k'] denotes a subcolumn that captures all e' [p', k'] substrings within the d'i column. The r'th row in that column d'i may be represented as d'i [p', k'] [r'].

For example, if the second tabular dataset D' includes data corresponding to a car loan application of a user, within columns d'i, the first column may include a "name column," the second column may include an "income" column, the third column may include a "date of birth" column, the fourth column may include a "nationality" column, the ith column may include a "home address" column, etc. In this example, the total of ND' columns of the second tabular dataset D' may include five columns, but the disclosure is not limited thereto.

Entities e' may represent data included within these columns d'i. For example, in the "name column," entity may represent the name of the user, e.g., John Francis Doe. In the "income" column, may represent yearly income of John Francis Doe. In the "date of birth" column may represent the date of birth of John Francis Doe, etc., but the disclosure is not limited thereto.

A subentity may represent whether John Francis Doe is a male or female under the "name column," where "male" designation may be represented in a first subcolumn and "female" designation may be represented in second subcolumn within the "name column," but the disclosure is not limited thereto. Similarly, a subentity may represent that the yearly income of John Francis Doe is $100,000. A subentity may represent that the date of birth of John Fransis Doe is Nomveber 1, 1979 in the "date of birth" column, where the month of birth "November" may be represented in a first subcolumn under the "date of birth" column, day of birth "1" may be represented in a second subcolumn under the "date of birth" column, and the year of birth "1979" may be represented in a third subcolumn under the "date of birth" column, etc., but the disclosure is not limited thereto.

Thus, in the above example, a "substring" including the "name" column, "income" column, and the "date of birth" column may be represented as "John_Francis_Doe_$100000_November_1_1979".

In some embodiments, the IEMM 406 may be configured to find unique subentities that appear in the two tabular datasets D and D'. A matching set may be defined as the set of all possible pairs of subentities. In the above example first name "John", last name "Doe", and date of birth Nov. 1, 1979 match. The process of "matching set" is described below with reference to FIG. 7.

In some embodiments, at step S504, the process 500 implemented by the IEMM 406 of FIG. 4 may further include preprocessing the received tabular datasets D, D', by calling the preprocessing module 432 via the tenth API, by deleting columns with null values or datetime values from the first tabular dataset D and the second tabular dataset D'; padding rows of the first tabular dataset D and the second tabular dataset D' with a constant character; and generating a uniform length of strings in the columns $d_i$ and d'i.

In some embodiments, at step S506, the process 500 implemented by the IEMM 406 may include, applying, by calling the applying module 416 via the second API, an artificial intelligence based search algorithm onto the received first tabular dataset D and the second dataset D' with a plurality of heuristics. For example, the artificial intelligence based search algorithm may include Monte Carlo Tree Search (MCTS) algorithm, but the disclosure is not limited thereto.

As mentioned earlier, in generic entity matching, the goal may be to identify a tuple of records from two data sources that may refer to the same entity. Entity matching, however, between large datasets, i.e., the first tabular dataset D and the second tabular dataset D', may prove to be a challenging task. For example, in the absence of semantics, conventional state-of-the-art natural language processing approaches may prove to be incapable of conducting matching, due to their relying on the meaning of text data. The lack of semantic information in data may arise from various factors such as encryption, or internal data transformation syntax, and naming conventions.

Figure 6:
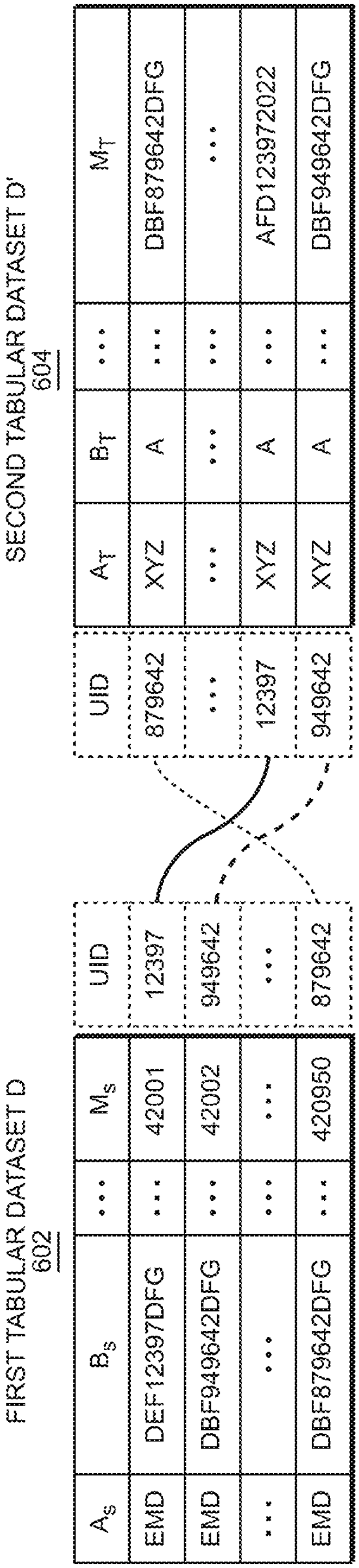
FIG. 6 illustrates an overview of non-semantic subentity matching among two datasets in according with an embodiment.

The IEMM 406 disclosed herein may be configured to utilize MCTS with multiple heuristics in solving Non-Semantic Subentity Matching (NSSEM) problem to overcome the combinatorial complexity of the problem. FIG. 6 illustrates an overview 600 of NSSEM among two datasets, i.e., first tabular dataset D 602 and second tabular dataset D' 604 in according with an embodiment. Referring back to FIG. 4, the first tabular dataset D 602 may be stored in the first database 412*a* and the second tabular dataset D'604 may be stored in the second database 412*b*.

Consider a retailer who has updated their databases using third party software. Occasionally, they may need to refer to the old database, i.e., the first database 412*a*, and query the features of the entity of interest. If the schema of the new database, i.e., the second database 412*b*, and the feature values are stored differently, a matching mechanism may be required in order to complete a successful query. An entity in the older database (i.e., the first database 412*a*) with the product ID of 12397 originating from table DEF and belonging to product category DFG, may be presented as DEF12397DFG, where "DEF" represents table ID, "123397" represents product ID, and "DFG" represents category code. While in the new database (i.e., the second database 412*b*), the same product may be represented with some added and removed data as AFD123972022, where "AFD" represents entity supplier, "12397" represents product ID, and "2022" represents timestamp.

The example above shows the necessity of a UID that serves as match representation for the databases, i.e., the first database 412*a* and the second database 412*b*. While expert knowledge and proper documentation may speed up entity matching tasks, that may not necessarily be feasible due to operational imperfections in development.

MCTS, as implemented by the IEMM 406 of FIG. 4, is a heuristic search algorithm that may balance exploration and exploitation in decision making. Instead of performing exhaustive search, MCTS may identify promising subspaces of the search space and expands them. The evaluation of the nodes and backpropagation thereof to parent nodes (see, e.g., FIGS. 7 and 8), guides the search and increases the chance of finding an optimal node, making it suitable for problems with large search spaces. The utilization of multi-heuristics allow the IEMM 406 to speed up the search by using each heuristic only in the appropriate area of the search space.

Figure 7:
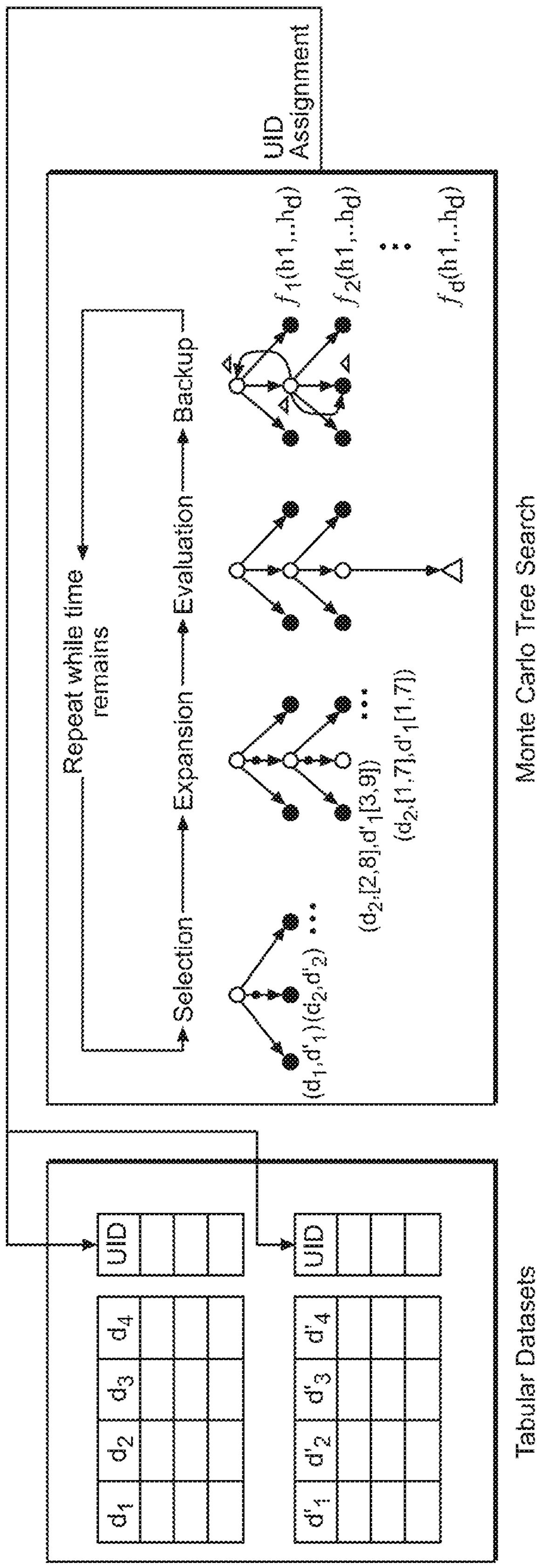
FIG. 7 illustrates a schematic overview of a Monte Carlo tree search algorithm implemented by the platform, language, database, and cloud agnostic intelligent entity matching module of FIG. 4 in according with an embodiment.
Figure 8:
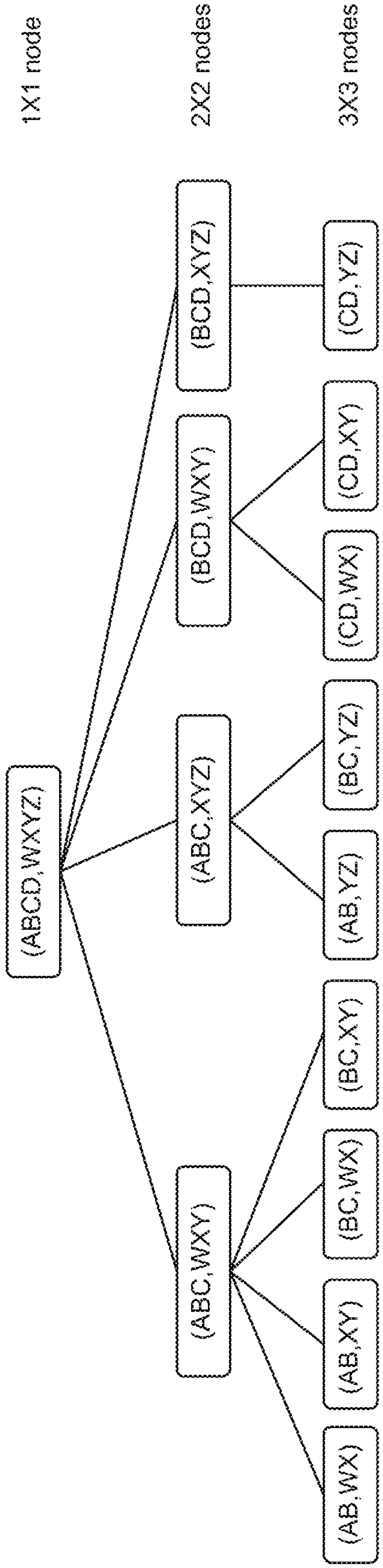
FIG. 8 illustrates a search subtree of the Monte Carlo tree search algorithm of FIG. 7 in accordance with an embodiment.

FIG. 7 illustrates a schematic overview 700 of an MCTS algorithm implemented by the IEMM 406 of FIG. 4 in according with an embodiment. FIG. 8 illustrates a search subtree 800 of the MCTS algorithm of FIG. 7 in accordance with an embodiment.

In some embodiments, the IEMM 406 may be configured to find unique subentities that appear in the two tabular datasets D and D'. A matching set M may be defined as the set of all possible pairs of subentities as follows:

$$\mathcal{M}=\{\langle e[p,k], e'[p',k']\rangle \mid p<k, p'<k', e\in \mathcal{D}, e'\in \mathcal{D}'\}$$

The IEMM 406 may be configured to find a set M* that maximizes the utility function u as follows:

$$M^* = \underset{M \subset \mathcal{M}}{\operatorname{argmax}}\, u(M)$$

where the utility u for the NSSEM problem mentioned above may be defined as:

$$u = \sum_{e,e'} \delta_{e,e'}$$

Where δ is the Kronecker delta function, which returns 1 when both subentities are identical at every character. Matched sets $$M_D^*$$

and $$M_{D'}^*$$

may be defined which represent the set of first and second components of matching pairs in M, respectively:

$$M_D^* = \{e \mid e \in \mathcal{D}, \langle e[p,k], e'[p',k']\rangle \in M^*\}$$

$$M_{D'}^* = \{e' \mid e' \in \mathcal{D}', \langle e[p,k], e'[p',k']\rangle \in M^*\}$$

Referring back to FIGS. 4-10, at step S508, the MCTS algorithm executed by the process 500 may include selecting, by calling the selecting module 418 via the third API, a node "s" represented as a pair of subcolumns $d_i$ [p, k] and d'i [p', k'], the node "s" having a plurality of attributes. In some embodiments, the plurality of attributes of the node "s" may include the following attributes: name, leaf, value, parent, dummy, children, and tier, wherein s.name is a tuple of subcolumns $d_i$ [p, k], d'i [p', k'] that it represents; s.parent is a parent node of "s"; s.children is a list of all nodes where s is their parent, s. leaf=True indicates that the node "s" has not yet been expanded; and s.tier represents how far down a search tree node "s" is, thereby identifying a number of ancestor nodes. All nodes s start with s. leaf=True.

In this step S508, the MCTS algorithm implemented by the IEMM 406 may decide which node to visit next. As a result, there is a need for a policy selection. In some embodiments, the IEMM 406 may be configured to implement Upper Confidence Bound (UCB) policy as follows:

$$\text{argmax}\{v_s + C\sqrt{N_p/N_s}\}$$

where $v_s$ is the value of the node "s" computed in an evaluation step, $N_s$ is the number of times node "s" is visited, $N_p$ is the number of times the parent node has been visited. The choice of C (sequence bias) affects the ratio of exploration versus exploitation in the search. For example, Algorithm 1 illustrates a pseudo code for MCTS helper functions. The IEMM 406 sets C=2 as the sequence bias. This function is shown in lines 17 to 24 of Algorithm 1.

Algorithm 1 MCTS helper Functions

```
1:  function Expands (s, A, τ1)
2:    d_i[p, k], d'_i[p', k'] ← s.name
3:    S ← { }
4:    if k − p > τ1 and k' − p' > τ1 then
5:      S ← S ∪ {<d[p, k − 1], d'[p', k' − 1]>,
6:          <d[p + 1, k], d'[p' + 1, k']>,
7:          <d[p, k − 1], d'[p'+ 1, k']>,
8:          <d[p + 1, k], d'[p', k' − 1]>}
9:    end if
10:   S ← S ∪ dummy node
11:   S ← S ∪ s
12:   S ← S − A
13:   A ← A ∪ S
14:   return S
15: end function
16:
17: function Select(s)
18:   vs ← s.value
19:   Ns ← number of s is selected
20:   Np ← number of times parent of s is selected
21:   i ← argmax {vs + √Np/Ns}
22:   s.Ns ← s.Ns + 1
23:   return i
24: end function
25:
26: function Backup(s)
27:   while s is not root node do
28:   s.parent .value ← max(s.value, s.parent .value)
29:   s ← s.parent
30:   end while
31: end function
32:
33: function Evaluate(s)
34:   d_i[p, k], d'_i[p', k'] ← s.name
35:   tier ← s.tier
36:   h1 ← |{e | e ∈ d_i[p, k] or e ∈ d'_i[p', k']}|
37:   h2 ← k − p
```

-continued

Algorithm 1 MCTS helper Functions

```
38:   h3 ← |k − p − (k' − p')|
39:   h4 ← |{e | e ∈ d_i[p, k]} ∩ {e' ∈ d'_i[p', k']}|
40:   return (h1 + h2 + sgn(tier − 1)h4) / max(|D| − |D[UID]| · |D'| − |D'[UID]|) − h3
41: end function
42:
43: function UID Assignment( D, D', nodes s, v, τ2)
44:   if v > τ2 then
45:     L ← {e | e ∈ di[p, k]} ∩ {e' ∈ d'_i[p', k']}
46:     for i from 0 to |L| do
47:       r ← L [i] · index
48:       D[U I D][r] ← D[d_i[p, k]][r]
49:       D'[UID][r] ← D'[d'_i[p', k']][r]
50:     end for
51:   end if
52:   return D, D'
53: end function
```

In some embodiments, at step S508, the MCTS algorithm executed by the process 500 may also include expanding, by calling the expanding module 420 via the fourth API, the node "s" to its child nodes in response to determining that the selected node "s" is not a terminal node, wherein the child nodes include all pairs of subcolumns with one size smaller than their parent while bigger than a configurable user-defined threshold size. A dummy node is a terminal node that does not represent any pairs of subcolumns. For example, FIG. 8 illustrates an example search subtree 800 of the MCTS algorithm of FIG. 7 where subentities from the tabular datasets D and D' of size four (4) are expanded (a configurable threshold size), but the disclosure is not limited thereto.

The deeper the search subtree 800 expands, the smaller size subcolumns the node represents. In tier i of the search tree (i>1) there are $i^2$ nodes. In general, for N columns in the tabular datasets D and D', where the maximum string length in columns is |e|, the total number of nodes is:

$$N^2 \cdot \sum_{i=1}^{|e|} i^2 = N^2 \cdot \frac{|e|(|e|+1)(2|e|+1)}{6}$$

Resulting in worst case $0(N^2|e|^3)$ complexity. For a pair of columns, $$\sum\nolimits_{i=1}^{|e|} i^2$$

is the total number of expanded nodes (see FIG. 8) and $N^2$ corresponds to the total number of column pairs.

At step S508, when it is determined that a node is not terminal, it expands its child nodes the first time it is selected. For a generic node s, the set of all child nodes may consist of all pairs of subcolumns $d_i$[p, k] and $d'_i$ [p', k'] with one size smaller than their parent while bigger than the configurable user-define threshold size $\tau_1$. If a node already exists in another subtree, it is not included the expansion (Algorithm 1, Line 12 in the pseudo code mentioned earlier). As a design choice, the IEMM 406 may introduce a terminal dummy child node that represents its parent node. The mentioned steps are presented in Algorithm 1, lines 1 to 15 in the pseudo code.

At step S510, the MCTS algorithm executed by the process 500 may include, evaluating, by calling the evaluating module 422 via the fifth API, evaluating values of the selected node "s" by utilizing the plurality of heuristics. In some embodiments, in evaluating the selected node "s", the plurality of heuristics may include the following: h1—the number of unique values in both subcolumns $d_i$ [p, k] and $d'_i$ [p', k'], wherein the smaller this unique value is, the less likely it is a candidate for matching (line 36 of Algorithm 1); h2—the sum of the maximum length of string values in both subcolumns $d_i$ [p, k] and $d'_i$ [p', k'] (line 37 of Algorithm 1); h3—the absolute difference between the maximum length of a subcolumn in the first tabular dataset D and the second tabular dataset D' (line 38 of Algorithm 1); and h4—the number of unique substrings in a subcolumn of the first tabular dataset D that also appear in a subcolumn of the second tabular dataset D' (line 39 of Algorithm 1), but the disclosure is not limited thereto. The heuristics may be formed as below:

$$h = \frac{h_1 + h_2 + \mathrm{sgn}(\mathrm{tier} - 1)h_4}{\max(|\mathcal{D}| - |M_D^*|, |\mathcal{D}'| - |M_{D'}^*|)} - h_3$$

In the numerator, at the first tier, columns that are more likely to be matched may be evaluated based on the number of their unique values. In the denominator, the IEMM 406 may be configured to normalize the heuristics, by the size of the unmatched data, ensuring that the evaluation adapts to the size of the remaining unmatched data, but the disclosure is not limited thereto these heuristics mentioned above. For example, slightly different heuristics may also be utilized by the IEMM 406 depending on various desired use cases and/or applications without departing from the scope of present disclosure as disclosed herein.

In some embodiments, When the search reaches a terminal node, the evaluated value may be backpropagated, by calling the backup module 424 via the sixth API, along the path toward the root node. For each node and its parent, the value may be backpropagated only if the node's value is greater than its parent's value (see Algorithm 1, Lines 26-31).

As mentioned earlier, in the NSSEM problem, the goal is to assign unique UIDs to matched entities. This UID assignment occurs when the search identifies that the number of unique subentities within a pair of subcolumns surpasses a configurable user-defined threshold $\tau_2$. In this case, the UID for each record, may be the subentity the node represents. This is shown in Algorithm 1, Lines 43 to 53.

For example, at step S512, the MCTS algorithm implemented by the IEMM 406 may include, detecting, based on evaluating, by calling the detecting module 426 via the seventh API, shared substrings between the first tabular dataset D and the second tabular dataset D' that refer to a same record.

At step S514, the MCTS algorithm implemented by the IEMM 406 may include, matching, by calling the matching module 428 via the eighth API, entities between the first tabular dataset D and the second tabular dataset D' based on the detected shared substrings. For example, FIG. 6 illustrates an overview 600 of NSSEM among the first tabular dataset D 602 and the second tabular dataset D' where values from column Bs and Mt matched. For example, product ID 12397 from column Bs of the first tabular dataset D 602 matched with product ID 12397 from column Mt of the second tabular dataset D' 604; product ID 949642 from column Bs of the first tabular dataset D 602 matched with product ID 949642 from column Mt of the second tabular dataset D' 604; product ID 879642 from column Bs of the first tabular dataset D 602 matched with product ID 879642 from column Mt of the second tabular dataset D' 604. The matches are shown in the UID column of both the first tabular dataset D 602 and the second tabular dataset D' 604. Although FIG. 6 illustrates two tables, i.e., the first table that includes the first tabular dataset D 602 and the second table that includes the second tabular dataset D' 604, the disclosure is not limited thereto. For example, the IEMM 406 may be configured to perform entity matching between more than two tables or even less structured data such as XML or JSON, without departing from the scope of the present disclosure.

At step S516, the MCTS algorithm implemented by the IEMM 406 may include, assigning, by calling the assigning module 430 via the ninth API, UIDs (see FIG. 6, the UID columns) to the matched entities when the step of matching identifies that a number of unique subentities e [p, k], e' [p', k'] within the pair of subcolumns $d_i$ [p, k] and $d'_i$ [p', k'] surpasses the configurable user-defined threshold value 12, thereby reducing processing time for matching entities, without semantic information, between the first database 412*a* and the second database 412*b*.

FIG. 7 illustrates that the MCTS algorithm repeats the selection, expansion, evaluation and backup steps mentioned above with reference to FIG. 5 for a configurable amount of time, where each tier may use different heuristics discussed above. As illustrated in FIG. 7, the UID assignment occurs when the search identifies that the number of unique subentities e [p, k], e' [p', k'] within the pair of subcolumns $d_i$ [p, k] and $d'_i$ [p', k'] surpasses the configurable user-defined threshold value $\tau_2$. As discussed above, the UID for each record, may be the subentity the node represents (see, Algorithm 1, Lines 43 to 53).

Algorithm 2 below illustrates a pseudo code of the MCTS algorithm for NSSEM in according with an embodiment. With the definition of the MCTS steps, i.e., selection, expansion, evaluation, backup, UID assignment, Algorithm 2 integrates the search components discussed earlier.

Algorithm 2 MCTS for NSSEM problem

Require: Root node so, datasets D, D', functions Expand, Select, Backup, Evaluate from Algorithm 1, $\tau_1$, $\tau_2$, and a budget Ensure: Augmented datasets D and D' with column U I D

```
A ← { }
s ← s0
while Breaks exist or budget remains do
   if s.terminal is False and s.leaf is True then
      s.children ← Expand(s, A, τ1)
      s.leaf ← False
   end if
   if s.terminal is True then
      v ← Evaluate(s)
      s.value ← v
      Backup(s)
         D' , D ← UID Assignment(D, D' , s, v, τ2)
      s ← s0
```

-continued

```
Ensure: Augmented datasets D and D' with column U I D

14:     end if
15:     i ← Select(s)
16:     s ← s.children [i]
17:   end while
18:   return D' , D
```

This Algorithm 2 mentioned above requires two datasets D and D' and a root node so that represents no column pairs. First, an empty set A may be created by the IEMM 406 to store all the new expanded nodes (Line 1 in Algorithm 2) and node s is initialized with the root node $S_0$ in Line 2 in Algorithm 2. The MCTS steps may be repeated (see FIG. 7) in the main loop (Lines 3-17 in Algorithm 2) as long as there are remaining breaks in the datasets or there is remaining budget (e.g., time or computation). The loop starts with the node s being expanded to its children in the case of it being a leaf non-terminal node (Line 5 in Algorithm 2). If s is a terminal node, it may be evaluated using the evaluation function discussed earlier (Line 9 in Algorithm 2), and the value may be backpropagated to the root (Line 11 in Algorithm 2). If the evaluation shows that the number of matches are exceeding threshold T2, then the UIDs are assigned in Line 12 of Algorithm 2. Finally, in the selection step (Lines 15-16 in Algorithm 2), the next node may be selected using the UCB policy mentioned earlier.

In some embodiments, synthetic data may be generated for the NSEEM problem mentioned above with reference to FIGS. 4-10 for the matching algorithm. To evaluate the performance of the MCTS, the IEMM 406 may utilize synthetic data for solving the NSSEM problem. Using all the heuristics mentioned earlier may result in faster convergence of the solution. There are various metrics that may be utilized in this evaluation. Coverage or the ratio of matched entities may be utilized as a first metric. In doing so, it may be preferred that the matching assigns UIDs longer in length. Average UID length ratio may be the second metric that may be utilized in measuring the effectiveness of using the MCTS. The last metric that may be utilized is the number of visited nodes—the less it is, the more efficient the search will be.

In some embodiments, to evaluate the effectiveness of using multi-heuristic MCTS, the performance of MCTS may be compared against two baselines. The first baseline may be to execute MCTS with a single heuristic, and the second baseline may be breadth-first-search (BFS). BFS starts at a given node and explores all of its neighbors at the current depth level before moving on to nodes at the next depth level. BFS explores nodes layer by layer, ensuring all the nodes at depth d are visited before those at depth d+1 are visited. BFS employs a first-in, first-out (FIFO) queue to evaluate the nodes. If the evaluated node value is greater than the threshold, entities are matched and UIDs are assigned. The primary difference between node expansion in BFS and MCTS is the absence of terminal dummy nodes in BFS. The search ends when all the nodes are visited, or the timeout occurs.

For the purpose of evaluation, thousands of synthetic datasets may be generated with varying parameters as explained in Table 1 below. In some embodiments, the IEMM 406 may utilize a subset of the datasets for empirical evaluations. For example, to benchmark the reconciliation tasks, the IEMM 406 may be configured to create different types of pairs of datasets with varying factors in order to evaluate the MCTS algorithm. For example, n represents the number of total columns. Increasing the number of columns, increases the number of nodes in the search tree. In some embodiments, n may be set to a value from 1 to 10 for both tabular datasets D and D', but the disclosure is not limited thereto. It may be assumed that there is no interdependency of the columns in each dataset. The number of rows may be represented as m. The greater it is, the longer it takes for the heuristics to be computed. In some embodiments, m may be set to a value of 1000, but the disclosure is not limited thereto. The number of columns may be represented as p where at least one record is matched. The IEMM 406 may choose p from {1, 2, 3} while p≤n. The length of the strings that succeeds the ground truth unique identifier may be represented as lsu. The IEMM 406 may choose values from {1, 2, 3} for Isu. The length of the strings that precedes the ground truth unique identifier may be represented as lpr. The IEMM 406 may choose values from {1, 2, 3} for lpr. The length of the UID may be represented as I. The IEMM 406 may choose values from {7, 8, 9, 10} for l. Table 1 below summarizes the synthetic dataset categories mentioned above.

TABLE 1

Synthetic Dataset Categories

| | n | p | $l_{pr}$ | $l_{su}$ | l |
|---|---|---|---|---|---|
| Easy | {1, 2, 3} | 1 | 1 | 1 | 7 |
| Moderate | {4, 5, 6, 7} | 2 | 2 | 2 | 8 |
| Hard | {8, 9, 10} | 3 | 3 | 3 | 9 |

In Table 1, the datasets may be categorized into easy, moderate, and hard based on their parameters. Algorithm 3 illustrates a pseudo code of synthetic data generation for NSSEM in according with an embodiment. The pseudo code for generating the synthetic data is presented in Algorithm 3 below.

Algorithm 3 Synthetic Data Generation

Require: Number of columns n, number of rows m, length of the ground truth l, p, lpr, lsu, 1: Create empty data frames D and D' with m rows and n columns
2: UID←Generate m strings of length I with randomly selected ASCII characters
3: Pres, Pret← Generate m strings of length lpr with randomly selected ASCII characters
4: Posts, Postt← Generate m strings of length Isu with randomly selected ASCII characters
5: AU IDt←-Concatenate (Pret, UID, Postt)
6: AU IDs←—←Concatenate (Pres, UID, Posts)
7: $c_s$, $c_t$←randomly select subset of columns in D and in D' with size p
8: for i from 1 to p do
9: for each row r in [i*m/p, (i+1)*m/p]] do
10: D [$c_s$ [i] [r]<AUIDs [r]
11: D' [$c_t$ [i] [r]<-AU IDt [r]
12: end for
13: end for
14: Populate empty columns with random categorical variables and strings
15: Randomly shuffle rows in both datasets
16: return D and D'

In summary, the goal of Algorithm 3 is to generate data frames filled with non-semantic values for the NSSEM problem. Algorithm 3 generates m unique UID with length l. Then each UID is augmented with random prefixes and suffixes of size Ipr and Isu (Lines 2-6 in Algorithm 3). The non-augmented portion of UID is the same in both datasets D and D'. Then augmented UIDs are placed in p columns where each column receives m/p rows (Lines 7-13 in algorithm 3). Finally, the remainder of columns and rows are filled with randomly generated text and shuffled.

However, experimental results with the synthetic data indicate that utilizing MCTS with multiple heuristics as discussed above with reference to FIGS. 4-8, instead of the two baselines, MCTS with a single heuristic and the BFS, may prove to be the best approach to circumvent the combinatorial aspect of the matching problem corresponding to NSSEM.

In some embodiments, the IEMM 406 may be configured to leverage known schema matching (in the case of semantically meaningful schema) and prioritizing the search over ranked column matches to improve the search time efficiency. The IEMM 406 may also be configured to leverage known Large Language Model (LLM) few-shot learning mechanism as a solution tool for NSSEM problem. In few-shot learning, models may be trained with only a small number of examples (or "shots") per task. This may range from 1-shot to 10-shot learning, depending on the task and the model. Moreover, the design of heuristics may be optimized for MCTS mentioned above based on some labeled training data.

In some embodiments, the IEMD 402 may include a memory (e.g., a memory 106 as illustrated in FIG. 1) which may be a non-transitory computer readable medium that may be configured to store instructions for implementing a platform, language, database, and cloud agnostic IEMM 406 for matching entities in databases without semantic information as disclosed herein. The IEMD 402 may also include a medium reader (e.g., a medium reader 112 as illustrated in FIG. 1) which may be configured to read any one or more sets of instructions, e.g., software, from any of the memories described herein. The instructions, when executed by a processor embedded within the IEMM 406 or within the IEMD 402, may be used to perform one or more of the processes as described herein. In a particular embodiment, the instructions may reside completely, or at least partially, within the memory 106, the medium reader 112, and/or the processor 104 (see FIG. 1) during execution by the IEMD 402.

In some embodiments, the instructions, when executed, may cause a processor embedded within the IEMM 406 or the IEMD 402 to perform the following: receiving a first dataset from a first database, the first dataset having entities without semantic information and representing a first tabular dataset including corresponding columns and rows, wherein each column includes two or more subcolumns, wherein each subcolumn includes one or more subentities, and wherein for a given entity within the first tabular dataset, a subentity represents a substring of the given entity; receiving a second dataset from a second database, the second dataset having entities without semantic information and representing a second tabular dataset including corresponding columns and rows, wherein each column includes two or more subcolumns, wherein each subcolumn includes one or more subentities, and wherein for a given entity within the second tabular dataset, a subentity represents a substring of the given entity; applying an artificial intelligence based search algorithm onto the received first dataset and the second dataset with a plurality of heuristics for: selecting a node represented as a pair of subcolumns, the node having a plurality of attributes; evaluating values of the selected node by utilizing the plurality of heuristics; detecting, based on evaluating, shared substrings between the first tabular dataset and the second tabular dataset that refer to a same record; matching entities between the first tabular dataset and the second tabular dataset based on the detected shared substrings; and assigning unique identifiers to the matched entities when the step of matching identifies that a number of unique subentities within the pair of subcolumns surpasses a configurable user-defined threshold value, thereby reducing processing time for matching entities between the first database and the second database. In some embodiments, the processor may be the same or similar to the processor 104 as illustrated in FIG. 1 or the processor embedded within the IEMD 202, IEMD 302, IEMD 402, and IEMM 406 which may be the same or similar to the processor 104.

In some embodiments according to the non-transitory computer readable medium, the artificial intelligence based search algorithm may include an MCTS algorithm discussed above with reference to FIGS. 4-8, but the disclosure is not limited thereto.

In some embodiments, prior to applying the artificial intelligence based search algorithm, the instructions, when executed, may cause the processor 104 to further perform the following: deleting columns with null values or datetime values from the first tabular dataset and the second tabular dataset; padding rows of the first tabular dataset and the second tabular dataset with a constant character; and generating a uniform length of strings in the columns.

In some embodiments according to the non-transitory computer readable medium, in evaluating the selected node "s", the plurality of heuristics may include the following: number of unique values in both subcolumns, wherein the smaller this unique value is, the less likely it is a candidate for matching; sum of the maximum length of string values in both subcolumns; absolute difference between the maximum length of a subcolumn in the first tabular dataset and the second tabular dataset; and number of unique substrings in a subcolumn of the first tabular dataset that also appear in a subcolumn of the second tabular dataset, but the disclosure is not limited thereto.

In some embodiments according to the non-transitory computer readable medium, the plurality of attributes of the node "s" may include: name, leaf, value, parent, dummy, child, and tier, wherein s.name is a tuple of subcolumns that it represents; s.parent is a parent node of "s"; s.leaf indicates that the node "s" has not yet been expanded; and s.tier represents how far down a search tree node "s" is, thereby identifying a number of ancestor nodes, but the disclosure is not limited thereto.

In some embodiments according to the non-transitory computer readable medium, a node may be terminal when it is not expandable to a sub-tree, and the instructions, when executed, cause the processor 104 to further perform the following: expanding the node "s" to its child nodes in response to determining that the selected node "s" is not a terminal node, wherein the child nodes include all pairs of subcolumns with one size smaller than their parent while bigger than a configurable user-defined threshold size.

In some embodiments according to the non-transitory computer readable medium, a dummy node may be a terminal node that does not represent any pairs of subcolumns.

In some embodiments as disclosed above in FIGS. 1-8, technical improvements effected by the instant disclosure may include a platform for implementing a platform, language, database, and cloud agnostic intelligent entity matching module configured to automatically match entities in databases without semantic information by utilizing AI-based search algorithms with multiple heuristics that match records between datasets by discovering the correct substrings, or UID, that appear in both datasets, thereby decreasing overhead in terms of processing resources, reducing latency in data transfers, reducing memory space, reducing overall power consumption, etc., in database management, but the disclosure is not limited thereto.

Although the invention has been described with reference to several exemplary embodiments, it is understood that the words that have been used may be words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, method, and uses such as are within the scope of the appended claims.

In some embodiments, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that may be capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, may be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards may be periodically superseded by faster or more efficient equivalents having essentially the same functions. Accordingly, replacement standards and protocols having the same or similar functions may be considered equivalents thereof.

The illustrations of the embodiments described herein are intended to provide a general understanding of the various embodiments. The illustrations are not intended to serve as a complete description of all of the elements and features of apparatus and systems that utilize the structures or method described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it may not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for matching entities in databases without semantic information by utilizing one or more processors along with allocated memory, the method comprising:

receiving a first dataset from a first database, the first dataset having entities without semantic information and representing a first tabular dataset including corresponding columns and rows, wherein each column includes two or more subcolumns, wherein each subcolumn includes one or more subentities, and wherein for a given entity within the first tabular dataset, a subentity represents a substring of the given entity;

receiving a second dataset from a second database, the second dataset having entities without semantic information and representing a second tabular dataset including corresponding columns and rows, wherein each column includes two or more subcolumns, wherein each subcolumn includes one or more subentities, and wherein for a given entity within the second tabular dataset, a subentity represents a substring of the given entity;

deleting columns with null values or datetime values from the first tabular dataset and the second tabular dataset;

padding rows of the first tabular dataset and the second tabular dataset with a constant character; and generating a uniform length of strings in the columns;

applying an artificial intelligence based search algorithm onto the received first dataset and the second dataset with a plurality of heuristics for:

selecting a node represented as a pair of subcolumns, the node having a plurality of attributes;

evaluating values of the selected node by utilizing the plurality of heuristics;

detecting, based on evaluating, shared substrings between the first tabular dataset and the second tabular dataset that refer to a same record;

matching entities between the first tabular dataset and the second tabular dataset based on the detected shared substrings; and assigning unique identifiers to the matched entities when the step of matching identifies that a number of unique subentities within the pair of subcolumns surpasses a configurable user-defined threshold value, thereby reducing processing time for matching entities between the first database and the second database and reducing overall power consumption in database management.

2. The method of claim 1, wherein the artificial intelligence based search algorithm is a Monte-Carlo tree search algorithm.

3. The method of claim 1, wherein in evaluating the selected node "s", the plurality of heuristics include the following: number of unique values in both subcolumns, wherein the smaller this unique value is, the less likely it is a candidate for matching; sum of the maximum length of string values in both subcolumns; absolute difference between the maximum length of a subcolumn in the first tabular dataset and the second tabular dataset; and number of unique substrings in a subcolumn of the first tabular dataset that also appear in a subcolumn of the second tabular dataset.

4. The method of claim 1, wherein the plurality of attributes of the node "s" include: name, leaf, value, parent, dummy, child, and tier, wherein s.name is a tuple of subcolumns that it represents; s.parent is a parent node of "s"; s.leaf indicates that the node "s" has not yet been expanded; and s.tier represents how far down a search tree node "s" is, thereby identifying a number of ancestor nodes.

5. The method of claim 4, wherein a node is terminal when it is not expandable to a sub-tree, and the method further comprising:

expanding the node "s" to its child nodes in response to determining that the selected node "s" is not a terminal node, wherein the child nodes include all pairs of subcolumns with one size smaller than their parent while bigger than a configurable user-defined threshold size.

6. The method of claim 4, wherein a dummy node is a terminal node that does not represent any pairs of subcolumns.

7. A system for matching entities in databases without semantic information, the system comprising:

a processor; and a memory operatively connected to the processor via a communication interface, the memory storing computer readable instructions that, when executed, cause the processor to:

receive a first dataset from a first database, the first dataset having entities without semantic information and representing a first tabular dataset including corresponding columns and rows, wherein each column includes two or more subcolumns, wherein each subcolumn includes one or more subentities, and wherein for a given entity within the first tabular dataset, a subentity represents a substring of the given entity;

receive a second dataset from a second database, the second dataset having entities without semantic information and representing a second tabular dataset including corresponding columns and rows, wherein each column includes two or more subcolumns, wherein each subcolumn includes one or more subentities, and wherein for a given entity within the second tabular dataset, a subentity represents a substring of the given entity;

delete columns with null values or datetime values from the first tabular dataset and the second tabular dataset;

pad rows of the first tabular dataset and the second tabular dataset with a constant character; and generate a uniform length of strings in the columns;

apply an artificial intelligence based search algorithm onto the received first dataset and the second dataset with a plurality of heuristics that:

selects a node represented as a pair of subcolumns, the node having a plurality of attributes; evaluates values of the selected node by utilizing the plurality of heuristics;

detects, based on evaluating, shared substrings between the first tabular dataset and the second tabular dataset that refer to a same record;

matches entities between the first tabular dataset and the second tabular dataset based on the detected shared substrings; and assigns unique identifiers to the matched entities when the step of matching identifies that a number of unique subentities within the pair of subcolumns surpasses a configurable user-defined threshold value, thereby reducing processing time for matching entities between the first database and the second database and reduce overall power consumption in database management.

8. The system of claim 7, wherein the artificial intelligence based search algorithm is a Monte-Carlo tree search algorithm.

9. The system of claim 7, wherein in evaluating the selected node "s", the plurality of heuristics include the following: number of unique values in both subcolumns, wherein the smaller this unique value is, the less likely it is a candidate for matching; sum of the maximum length of string values in both subcolumns; absolute difference between the maximum length of a subcolumn in the first tabular dataset and the second tabular dataset; and number of unique substrings in a subcolumn of the first tabular dataset that also appear in a subcolumn of the second tabular dataset.

10. The system of claim 7, wherein the plurality of attributes of the node "s" include: name, leaf, value, parent, dummy, child, and tier, wherein s.name is a tuple of subcolumns that it represents; s.parent is a parent node of "s"; s.leaf indicates that the node "s" has not yet been expanded; and s.tier represents how far down a search tree node "s" is, thereby identifying a number of ancestor nodes.

11. The system of claim 10, wherein a node is terminal when it is not expandable to a sub-tree, and the system further comprising:

expanding the node "s" to its child nodes in response to determining that the selected node "s" is not a terminal node, wherein the child nodes include all pairs of subcolumns with one size smaller than their parent while bigger than a configurable user-defined threshold size.

12. The system of claim 10, wherein a dummy node is a terminal node that does not represent any pairs of subcolumns.

13. A non-transitory computer readable medium configured to store instructions for matching entities in databases without semantic information, the instructions, when executed, cause a processor to perform the following:

receiving a first dataset from a first database, the first dataset having entities without semantic information and representing a first tabular dataset including corresponding columns and rows, wherein each column includes two or more subcolumns, wherein each subcolumn includes one or more subentities, and wherein for a given entity within the first tabular dataset, a subentity represents a substring of the given entity;

receiving a second dataset from a second database, the second dataset having entities without semantic information and representing a second tabular dataset including corresponding columns and rows, wherein each column includes two or more subcolumns, wherein each subcolumn includes one or more subentities, and wherein for a given entity within the second tabular dataset, a subentity represents a substring of the given entity;

deleting columns with null values or datetime values from the first tabular dataset and the second tabular dataset;

padding rows of the first tabular dataset and the second tabular dataset with a constant character; and generating a uniform length of strings in the columns;

applying an artificial intelligence based search algorithm onto the received first dataset and the second dataset with a plurality of heuristics for:

selecting a node represented as a pair of subcolumns, the node having a plurality of attributes;

evaluating values of the selected node by utilizing the plurality of heuristics;

detecting, based on evaluating, shared substrings between the first tabular dataset and the second tabular dataset that refer to a same record;

matching entities between the first tabular dataset and the second tabular dataset based on the detected shared substrings; and assigning unique identifiers to the matched entities when the step of matching identifies that a number of unique subentities within the pair of subcolumns surpasses a configurable user-defined threshold value, thereby reducing processing time for matching entities between the first database and the second database and reducing overall power consumption in database management.

14. The non-transitory computer readable medium of claim 13, wherein the artificial intelligence based search algorithm is a Monte-Carlo tree search algorithm.

15. The non-transitory computer readable medium of claim 13, wherein in evaluating the selected node "s", the plurality of heuristics include the following: number of unique values in both subcolumns, wherein the smaller this unique value is, the less likely it is a candidate for matching; sum of the maximum length of string values in both subcolumns; absolute difference between the maximum length of a subcolumn in the first tabular dataset and the second tabular dataset; and number of unique substrings in a subcolumn of the first tabular dataset that also appear in a subcolumn of the second tabular dataset.

16. The non-transitory computer readable medium of claim 13, wherein the plurality of attributes of the node "s" include: name, leaf, value, parent, dummy, child, and tier, wherein s.name is a tuple of subcolumns that it represents; s.parent is a parent node of "s"; s.leaf indicates that the node "s" has not yet been expanded; and s.tier represents how far down a search tree node "s" is, thereby identifying a number of ancestor nodes.

17. The non-transitory computer readable medium of claim 16, wherein a node is terminal when it is not expandable to a sub-tree, and the instructions, when executed, cause the processor to further perform the following:

expanding the node "s" to its child nodes in response to determining that the selected node "s" is not a terminal node, wherein the child nodes include all pairs of subcolumns with one size smaller than their parent while bigger than a configurable user-defined threshold size.

* * * * *